United States Patent
Schneider et al.

(10) Patent No.: US 9,580,039 B2
(45) Date of Patent: Feb. 28, 2017

(54) MULTI-CHAMBER AIRBAG WITH UNIDIRECTIONAL VENT

(71) Applicant: Autoliv ASP, Inc., Ogden, UT (US)

(72) Inventors: David W. Schneider, Waterford, MI (US); ChangSoo Choi, Rochester, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/258,853

(22) Filed: Apr. 22, 2014

(65) Prior Publication Data

US 2015/0298643 A1  Oct. 22, 2015

(51) Int. Cl.
*B60R 21/233* (2006.01)
*B60R 21/239* (2006.01)
B60R 21/26 (2011.01)

(52) U.S. Cl.
CPC .......... *B60R 21/233* (2013.01); *B60R 21/239* (2013.01); *B60R 2021/23308* (2013.01); *B60R 2021/23324* (2013.01); *B60R 2021/26094* (2013.01)

(58) Field of Classification Search
CPC . B60R 21/205; B60R 21/233; B60R 21/2338; B60R 21/239; B60R 21/261; B60R 21/276; B60R 21/30; B60R 2021/23107; B60R 2021/23324; B60R 2021/23382; B60R 2021/2395; B60R 2021/26094; B60R 2021/2765

See application file for complete search history.

(56) References Cited

U.S. PATENT DOCUMENTS

| | | |
|---|---|---|
| 3,614,129 A | 10/1971 | Sobkow |
| 3,642,303 A | 2/1972 | Irish et al. |
| 3,768,830 A | 10/1973 | Hass |
| 3,801,126 A | 4/1974 | Knight, IV et al. |
| 4,043,572 A | 8/1977 | Hattori et al. |
| 4,262,931 A | 4/1981 | Strasser et al. |

(Continued)

FOREIGN PATENT DOCUMENTS

| | | |
|---|---|---|
| DE | 10146493 A1 | 4/2003 |
| DE | 102010019592 A1 | 11/2011 |

(Continued)

OTHER PUBLICATIONS

Office Action mailed Jun. 25, 2015, in U.S. Appl. No. 14/294,405, filed Jun. 3, 2014.

(Continued)

*Primary Examiner* — Barry Gooden, Jr.
(74) *Attorney, Agent, or Firm* — Stoel Rives LLP

(57) ABSTRACT

An airbag can include a first cushion portion that defines a first inflatable chamber and a second cushion portion that is connected to the first cushion portion and defines a second inflatable chamber. The first inflatable chamber can receive inflation gas from an inflator to expand the first cushion portion and the second cushion portion can receive inflation gas from the first inflatable chamber to expand the second cushion portion. A unidirectional valve permits inflation gas to flow from the first inflatable chamber to the second inflatable chamber and restricts backflow of inflation gas from the second inflatable chamber to the first inflatable chamber.

12 Claims, 17 Drawing Sheets

(56) References Cited

U.S. PATENT DOCUMENTS

| | | | |
|---|---|---|---|
| 5,556,128 A | 9/1996 | Sinnhuber | |
| 5,575,497 A * | 11/1996 | Suyama | B60R 21/231 280/730.1 |
| 5,586,782 A * | 12/1996 | Zimmerman, II | B60R 21/23138 280/730.2 |
| 5,609,363 A | 3/1997 | Finelli | |
| 5,697,641 A | 12/1997 | McGee et al. | |
| 5,791,685 A | 8/1998 | Lachat et al. | |
| 5,803,485 A | 9/1998 | Acker et al. | |
| 5,839,755 A | 11/1998 | Turnbull | |
| 5,853,191 A | 12/1998 | Lachat et al. | |
| 5,945,184 A * | 8/1999 | Nagata | B60R 21/233 280/728.1 |
| 6,123,355 A | 9/2000 | Sutherland | |
| 6,126,196 A | 10/2000 | Zimmerman | |
| 6,135,493 A | 10/2000 | Jost et al. | |
| 6,139,052 A | 10/2000 | Preamprasitchai | |
| 6,158,765 A | 12/2000 | Sinnhuber et al. | |
| 6,196,575 B1 | 3/2001 | Ellerbrok et al. | |
| 6,247,727 B1 | 6/2001 | Hamada | |
| 6,254,121 B1 | 7/2001 | Fowler et al. | |
| 6,308,983 B1 | 10/2001 | Sinnhuber | |
| 6,419,262 B1 | 7/2002 | Fendt et al. | |
| 6,431,586 B1 | 8/2002 | Eyrainer et al. | |
| 6,648,371 B2 * | 11/2003 | Vendely | B60R 21/217 280/739 |
| 6,786,505 B2 | 9/2004 | Yoshida et al. | |
| 6,971,664 B2 | 12/2005 | Amamori et al. | |
| 7,040,650 B2 | 5/2006 | Neupert et al. | |
| 7,261,320 B2 | 8/2007 | Fredin et al. | |
| 7,347,450 B2 | 3/2008 | Williams et al. | |
| 7,475,904 B2 | 1/2009 | Hofmann et al. | |
| 7,571,929 B2 | 8/2009 | Fukawatase et al. | |
| 7,726,685 B2 | 6/2010 | Abe et al. | |
| 7,850,200 B2 | 12/2010 | Zauritz et al. | |
| 7,938,445 B2 | 5/2011 | Smith et al. | |
| 7,942,443 B2 | 5/2011 | Dennis et al. | |
| 7,954,850 B2 * | 6/2011 | Fischer | B60R 21/233 280/738 |
| 7,988,188 B2 | 8/2011 | Zauritz et al. | |
| 8,186,713 B2 | 5/2012 | Fischer et al. | |
| 8,215,665 B2 | 7/2012 | Ohara et al. | |
| 8,567,817 B2 * | 10/2013 | Yamamoto | B60R 21/23138 280/729 |
| 8,573,641 B2 | 11/2013 | Marable et al. | |
| 8,596,678 B2 | 12/2013 | Ravenberg et al. | |
| 8,646,808 B2 * | 2/2014 | Williams | B60R 21/239 280/739 |
| 9,248,799 B2 | 2/2016 | Schneider et al. | |
| 9,272,684 B1 | 3/2016 | Keyser et al. | |
| 9,376,084 B2 | 6/2016 | Choi et al. | |
| 2003/0094794 A1 * | 5/2003 | Amamori | B60R 21/231 280/729 |
| 2003/0193174 A1 * | 10/2003 | Abe | B60R 21/206 280/730.1 |
| 2003/0209895 A1 * | 11/2003 | Gu | B60R 21/239 280/729 |
| 2003/0218325 A1 | 11/2003 | Hasebe et al. | |
| 2004/0046369 A1 | 3/2004 | Michael et al. | |
| 2004/0090054 A1 * | 5/2004 | Bossecker | B60R 21/233 280/739 |
| 2004/0145161 A1 | 7/2004 | Hasebe et al. | |
| 2005/0029781 A1 | 2/2005 | Enders et al. | |
| 2005/0104339 A1 | 5/2005 | Hasebe et al. | |
| 2005/0110249 A1 * | 5/2005 | Hasebe | B60R 21/231 280/729 |
| 2005/0184489 A1 | 8/2005 | Kobayashi | |
| 2005/0269808 A1 | 12/2005 | Song et al. | |
| 2006/0006631 A1 | 1/2006 | Meissner et al. | |
| 2006/0175809 A1 | 8/2006 | Yamaji et al. | |
| 2006/0197324 A1 | 9/2006 | Klinkenberger | |
| 2006/0232050 A1 | 10/2006 | Kumagai et al. | |
| 2006/0284400 A1 | 12/2006 | Sakakibara et al. | |
| 2006/0290111 A1 | 12/2006 | Kokeguchi | |
| 2007/0126217 A1 | 6/2007 | Nayef | |
| 2007/0170710 A1 * | 7/2007 | Bouquier | B60R 21/239 280/739 |
| 2007/0210565 A1 | 9/2007 | Song et al. | |
| 2008/0048420 A1 | 2/2008 | Washino | |
| 2008/0054602 A1 | 3/2008 | Yang | |
| 2008/0073893 A1 | 3/2008 | Schneider | |
| 2008/0100041 A1 | 5/2008 | Kim et al. | |
| 2008/0143086 A1 * | 6/2008 | Higuchi | B60R 21/233 280/736 |
| 2008/0179867 A1 | 7/2008 | Riedel et al. | |
| 2008/0308338 A1 | 12/2008 | Kitte et al. | |
| 2009/0020987 A1 * | 1/2009 | Wipasuramonton | B60R 21/233 280/729 |
| 2009/0026743 A1 | 1/2009 | Arez | |
| 2009/0121462 A1 | 5/2009 | Rick | |
| 2009/0189374 A1 * | 7/2009 | Fukawatase | B60R 21/239 280/740 |
| 2010/0066064 A1 | 3/2010 | Kotikovsky | |
| 2010/0078924 A1 * | 4/2010 | Mitsuo | B60R 21/205 280/743.2 |
| 2010/0133792 A1 * | 6/2010 | Agren | B60R 21/2346 280/729 |
| 2010/0252350 A1 | 10/2010 | Hayashi et al. | |
| 2011/0042923 A1 * | 2/2011 | Hatfield | B60R 21/201 280/730.2 |
| 2011/0101660 A1 | 5/2011 | Schneider et al. | |
| 2011/0140398 A1 | 6/2011 | Song et al. | |
| 2011/0248487 A1 * | 10/2011 | Burczyk | B60R 21/239 280/742 |
| 2011/0272927 A1 * | 11/2011 | Feller | B60R 21/233 280/729 |
| 2012/0025497 A1 | 2/2012 | Yoo | |
| 2012/0200069 A1 | 8/2012 | Kato et al. | |
| 2012/0223550 A1 | 9/2012 | Mazanek | |
| 2012/0235393 A1 * | 9/2012 | Fisher | B60R 21/2338 280/742 |
| 2012/0299277 A1 * | 11/2012 | Fischer | B60R 21/239 280/739 |
| 2013/0001935 A1 | 1/2013 | Nagasawa et al. | |
| 2013/0049336 A1 * | 2/2013 | Fukawatase | B60R 21/2338 280/741 |
| 2013/0087995 A1 | 4/2013 | Lee et al. | |
| 2013/0214517 A1 * | 8/2013 | Bogenrieder | B60R 21/235 280/743.1 |
| 2013/0334801 A1 * | 12/2013 | Williams | B60R 21/239 280/739 |
| 2014/0151985 A1 | 6/2014 | Hotta et al. | |
| 2014/0203542 A1 * | 7/2014 | Fukawatase | B60R 21/239 280/730.2 |
| 2014/0239617 A1 * | 8/2014 | Dix | B60R 21/233 280/728.2 |
| 2014/0265271 A1 | 9/2014 | Dinsdale et al. | |
| 2014/0375032 A1 | 12/2014 | Fukawatase et al. | |
| 2015/0035263 A1 | 2/2015 | Guerrero et al. | |
| 2015/0042080 A1 | 2/2015 | Guerrero et al. | |
| 2015/0069741 A1 | 3/2015 | Shimazu | |
| 2015/0076801 A1 * | 3/2015 | Fujiwara | B60R 21/231 280/729 |
| 2015/0158452 A1 | 6/2015 | Choi et al. | |
| 2015/0166002 A1 | 6/2015 | Fukawatase et al. | |
| 2015/0175116 A1 | 6/2015 | Cho et al. | |
| 2015/0217716 A1 | 8/2015 | Anderson | |
| 2015/0258959 A1 | 9/2015 | Belwafa et al. | |
| 2015/0266447 A1 | 9/2015 | Hiruta et al. | |
| 2015/0298643 A1 | 10/2015 | Schneider et al. | |
| 2016/0039385 A1 | 2/2016 | Watamori et al. | |

FOREIGN PATENT DOCUMENTS

| | | |
|---|---|---|
| DE | 102012019581 A1 | 4/2012 |
| EP | 2617607 A1 | 7/2013 |

(56) References Cited

FOREIGN PATENT DOCUMENTS

JP          06024283        2/1994
WO          2015156088      10/2015

OTHER PUBLICATIONS

International Search Report and Written Opinion for PCT/US2015/019716 mailed Jun. 3, 2015.
Office Action mailed Aug. 4, 2015, in U.S. Appl. No. 14/512,025, filed Oct. 10, 2014.
Office Action mailed Dec. 5, 2014, in U.S. Appl. No. 14/099,928, filed Dec. 7, 2013.
Office Action mailed Jan. 9, 2015, in U.S. Appl. No. 14/294,405, filed Jun. 3, 2014.
Restriction Requirement mailed May 12, 2015, in U.S. Appl. No. 14/512,025, filed Oct. 10, 2014.
Office Action mailed May 21, 2015, in U.S. Appl. No. 14/099,928, filed Dec. 7, 2013.
International Search Report and Written Opinion for PCT/US2014/067283 mailed Feb. 20, 2015.
International Search Report and Written Opinion for PCT/US2015/029615 mailed Sep. 23, 2015.
Office Action mailed Jun. 27, 2016, in U.S. Appl. No. 14/799,302, filed Jul. 14, 2015.
Office Action mailed Dec. 10, 2015, in U.S. Appl. No. 14/099,928, filed Dec. 7, 2013.
Office Action mailed Apr. 21, 2016, in U.S. Appl. No. 14/258,853, filed Apr. 22, 2014.

* cited by examiner

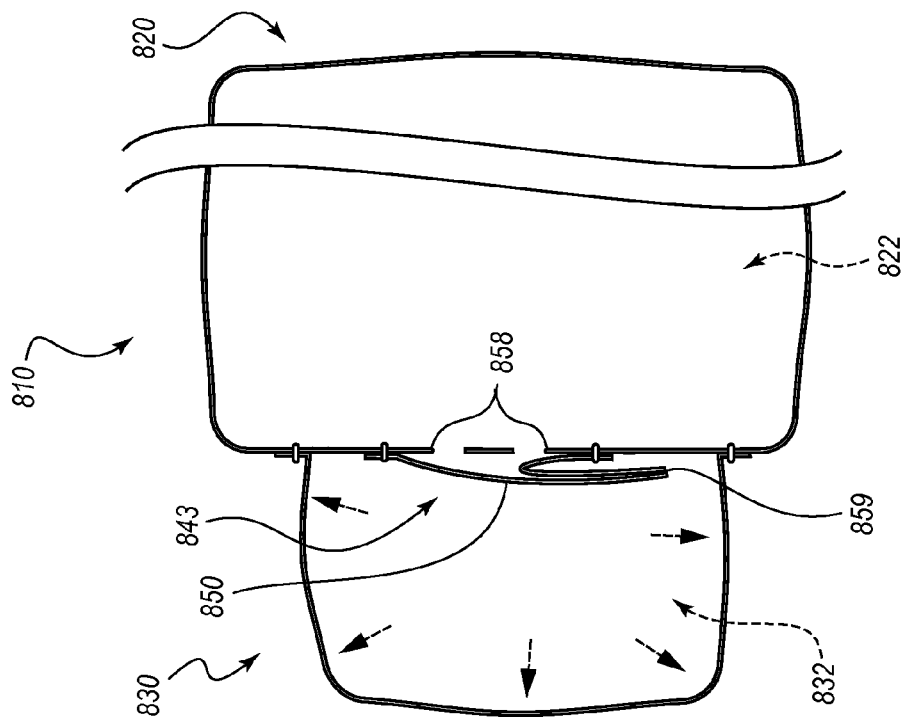
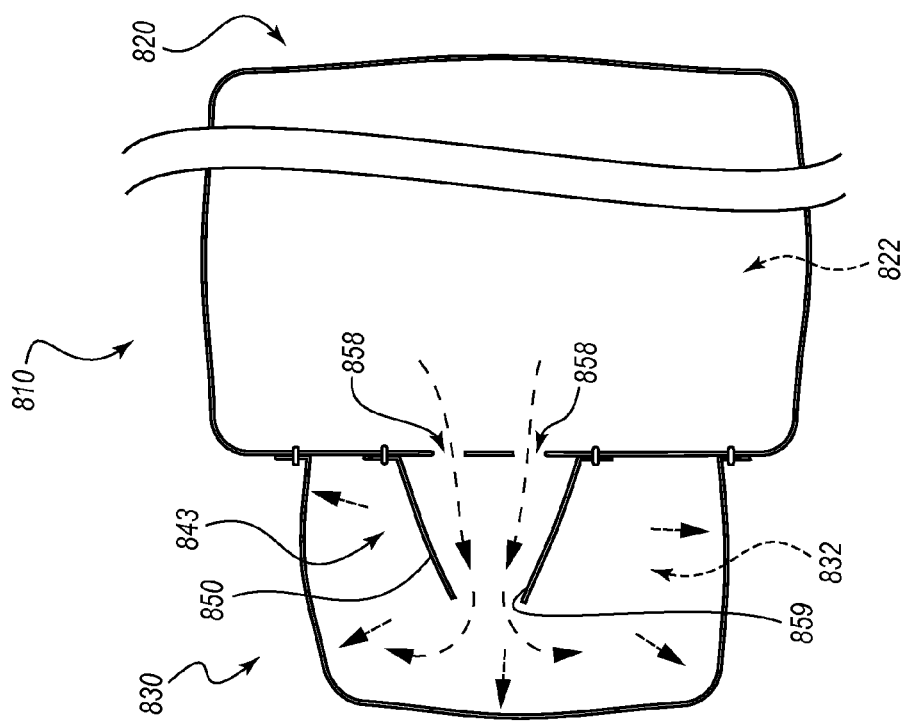
FIG. 11A
FIG. 11B

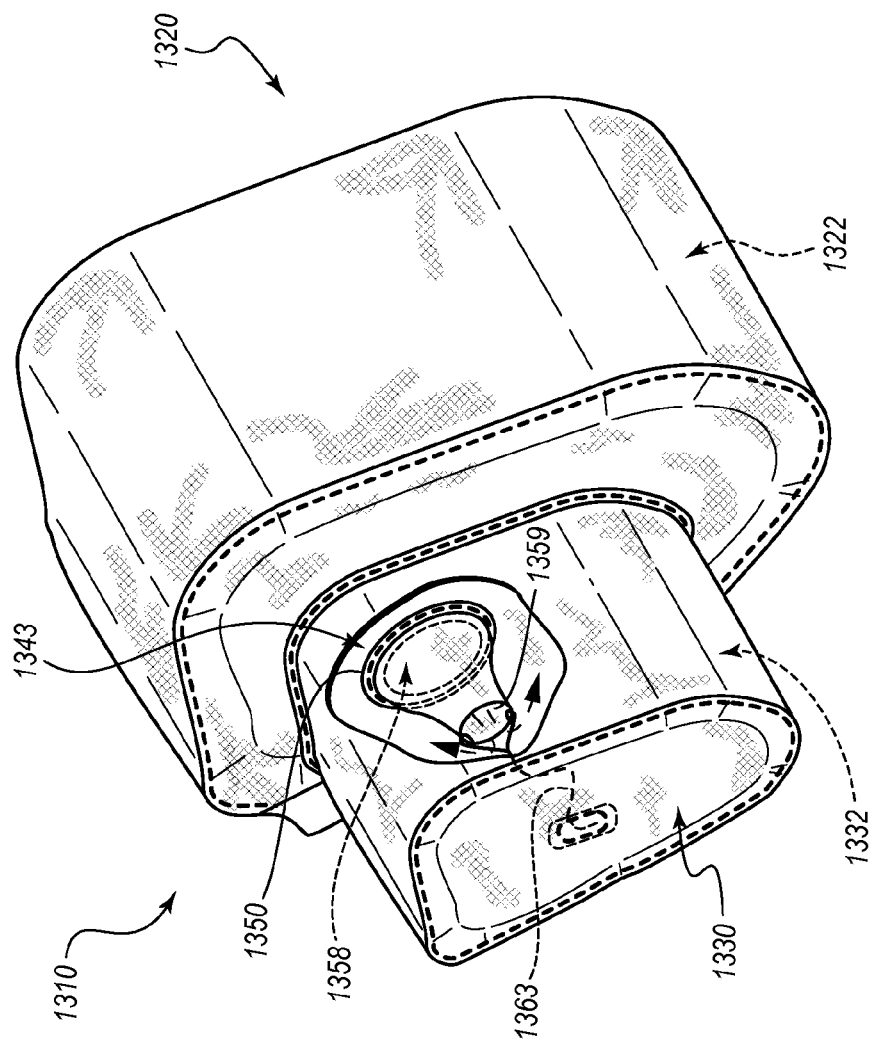

MULTI-CHAMBER AIRBAG WITH UNIDIRECTIONAL VENT

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 11A is a sectional view of the multi-chamber airbag shown in FIG. 10A taken along the line 11A-11A.

FIG. 11B is a sectional view of the airbag of multi-chamber airbag shown in FIG. 10B taken along the line 11B-11B.

FIG. 13A is a perspective partial cut-away view of a multi-chamber airbag of an airbag assembly, according to another embodiment, with a unidirectional vent in an open state.

DETAILED DESCRIPTION

Figure 1:
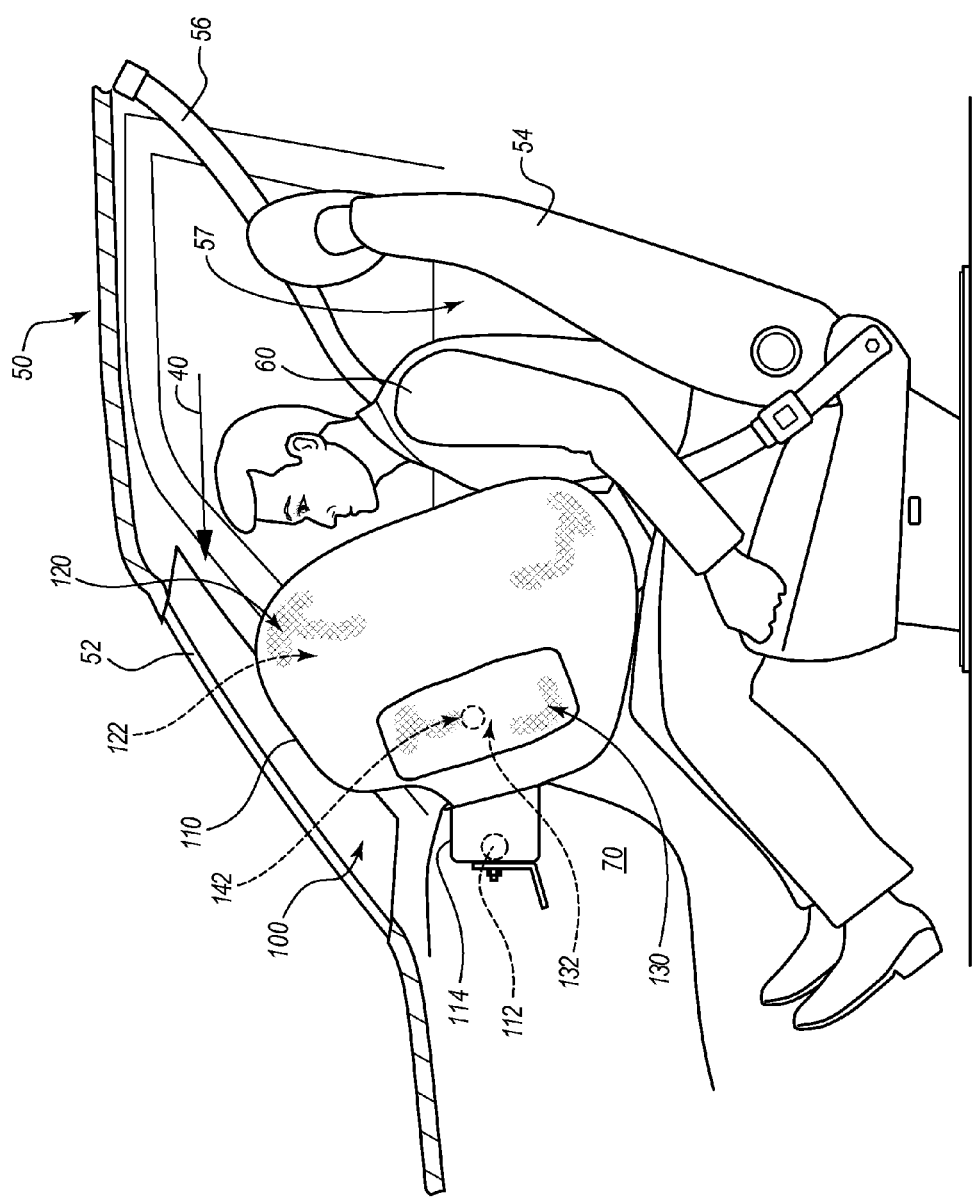
FIG. 1 is a side elevation view of an airbag assembly, according to one embodiment of the present disclosure, in a deployed state within a vehicle. The airbag assembly includes a multi-chambered airbag with a supplemental cushion attached to a primary cushion. The vehicle occupant is depicted moving toward the deployed airbag assembly in a direction of travel of the vehicle.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury during a collision event. Airbag modules have been installed at various locations within a vehicle, including, but not limited to, the steering wheel, the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for use as passenger airbags, and may be mounted in a dashboard. In some embodiments, an airbag assembly includes an airbag comprising multiple portions (e.g., cushions, chambers, regions, sections, or pieces) that are configured to cushion an occupant during a collision event. A first or primary cushion portion can be configured to deploy primarily toward a vehicle occupant position (e.g., the position typically occupied by a passenger). This primary cushion portion may be configured to receive the torso and/or the head of a passenger in a frontal collision event. A second or supplemental cushion portion may be configured to deploy primarily in a different direction, such as, for example, in an inboard direction. For example, the supplemental cushion portion may be configured to deploy primarily in a direction that is lateral, transverse, or perpendicular to the direction in which the first cushion portion is deployed. The supplemental cushion portion may be particularly suited for cushioning the head of a vehicle occupant when the occupant moves in an oblique direction relative to a direction of travel of the vehicle.

Airbags that have multiple cushion portions (e.g., multi-chamber airbags) may provide increased protection to a passenger, as compared with certain airbags that have only a single inflatable portion. For example, in some embodiments, the first (e.g., primary) cushion portion may be configured to receive a vehicle occupant in a frontal collision event that causes the vehicle occupant to move primarily directly forward, as previously stated, and/or primarily in a direction of travel. The second (e.g., supplemental) cushion portion may be configured to stabilize the first cushion portion relative to the dashboard and/or receive the passenger when the vehicle is involved in a collision that causes the vehicle occupant to move in both a forward direction and an inboard direction (e.g., oblique to the direction of travel). For example, in some instances a single-chamber airbag may be too narrow to provide effective coverage for a vehicle occupant who has a forward and inboard trajectory (which may also be referred to as an angled or oblique trajectory). In some instances, a vehicle occupant may slide off of the single-chamber airbag cushion during loading of the airbag when the occupant has a forward and inboard trajectory, or the occupant may entirely fail to engage with the cushion. An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is travelling in a direction that is not substantially parallel to the other vehicle's direction of travel; co-linear vehicle-to-vehicle collisions, such as collisions where, immediately prior to impact, both vehicles are travelling in substantially parallel directions; or collisions with a stationary object.

Some embodiments disclosed herein can provide improved positioning, cushioning, and/or safety to occupants involved in particular types of collisions. For example, some embodiments can be particularly suited to cushion front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version II)* (Dec. 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012).

In some embodiments, the first cushion portion is configured to inflate prior to inflation of a second cushion portion. For example, during a deployment event, an inflator may fill a first cushion portion with gas until the pressure within the airbag causes a temporary fastener to release the second cushion portion for deployment. In some embodiments, a first cushion portion may deploy or begin deployment before the second cushion portion begins to be deployed. The second cushion portion can be configured to receive gas via a vent that fluidly couples the first and second cushion portions. The vent may be unidirectional and/or adaptively closeable to isolate the second inflatable chamber from the first inflatable chamber upon equalization of pressure in the second inflatable chamber with pressure in the first inflatable chamber. Advantages of various embodiments will be evident from the present disclosure.

FIG. 1 is an elevation view of an instrument panel 70 and an airbag assembly 100 within a vehicle 50. The instrument panel 70 may also be referred to herein as a dashboard. In many vehicles 50, a central region of the instrument panel 70 can include a stack of various buttons, controls, and other user interfaces. For example, the central region, which may commonly be referred to as a center stack or as an IP stack 71 (see FIG. 2), can include one or more of a screen (such as for navigation, backup camera display, etc.), radio and/or other media controls, climate controls, etc. The airbag assembly 100 is depicted in a deployed and inflated configuration. A vehicle occupant 60 is shown seated in a front passenger seat 54 of the vehicle 50. When the airbag assembly 100 is not deployed, the airbag assembly 100 may be positioned within the instrument panel 70. As shown in FIG. 1, an occupant restraint system can include the airbag assembly 100 and any other suitable restraint devices, such as a seatbelt 56.

The airbag assembly 100 can include an inflatable airbag cushion 110 (which may also be referred to as an airbag), an inflator 112, and an airbag housing 114. The airbag housing 114 may be of any suitable variety, and may include a cover (not shown), behind which the airbag cushion 110 is located. The cover may be of any suitable variety, and may include a tear seam or burst seam through which the airbag cushion 110 may deploy. The housing 114 can be mounted within the dashboard 70 in any suitable manner.

The airbag 110 may be manufactured in any suitable manner, such as via one-piece weaving, "cut and sew" techniques, or a combination thereof. In some embodiments, separate panels may be joined together using sealed or unsealed seams, wherein the seams are formed by stitching, adhesive, taping, radio frequency welding, heat sealing, and/or any other suitable technique or combination of techniques.

In the illustrated embodiment, the inflatable airbag cushion 110 includes a first, or primary, cushion portion 120 connected to a second, or supplemental, cushion portion 130. The first cushion portion 120 can comprise any suitable shape. For example, in some embodiments, the first cushion portion 120 comprises any suitable passenger airbag configuration. In some embodiments, the first cushion portion 120 is formed of any suitable arrangement of panels. The panels may comprise separate pieces of material that are joined along seams or may be formed of a unitary piece of material, for example. For example, the first cushion portion 120 may include a side panel adjacent to a side door of the vehicle 50, an oppositely positioned side panel facing the interior of the vehicle 50, and one or more panels that connect the side panels to each other to at least substantially enclose and/or define a first inflatable chamber 122. The first cushion portion 120 may also be referred to as a primary cushion, a primary cushion portion, or a primary chamber.

The second cushion portion 130 can define a smaller volume than the first cushion portion 120, and may also be referred to as a supplemental cushion or a supplemental chamber. The second cushion portion 130 can comprise any suitable shape and configuration, and may be formed in any suitable manner. For example, the second cushion portion 130 may likewise comprise a plurality of panels that are joined together along their edges. The panels may be formed of separate pieces of material or from a single piece of material.

The second cushion portion 130 can be joined to the first cushion portion 120 in any suitable manner, such as via one or more seams. In some embodiments, a seam (such as a perimeter seam) that is used to join a side panel of the first cushion portion 120 to other panels of the first cushion portion 120 may also be used to join the second cushion portion 130 to the first cushion portion 120. For example, the second cushion portion 130 can be attached to the first cushion portion 120 by a perimeter seam (e.g., a perimeter stitch). In other embodiments, one or more seams that are separate from the perimeter seam may be used to join the first and second cushion portions 120, 130. For example, in some embodiments, a periphery of the second cushion portion 130 may be secured to a side panel of the first cushion portion 120 via stitching at a position internal to the periphery of the first cushion portion 120. In still other embodiments, the first and second cushion portions 120, 130 may be formed of a unitary piece of material.

In the illustrated embodiment, the second cushion portion 130 is smaller than the first cushion portion 120. In other embodiments, the second cushion portion 130 may be sized and/or shaped differently. For example, the second inflatable chamber 132 may have a similar volume to a volume of the first inflatable chamber 122. The second cushion portion 130 may extend further toward the occupant 60 than the embodiment shown in FIG. 1. The second cushion portion 130 may even possibly extend toward the occupant 60 to a similar or greater measure than the first cushion portion 120 (see e.g., FIG. 14, discussed below). The second cushion portion 130 may extend higher, possibly even higher than the first cushion portion 120. The second cushion portion 130 may extend lower, possibly even lower than the first cushion portion 120. The second cushion portion 130 may extend further forward toward a front of the vehicle, possibly even more forward than the first cushion portion 120, for example, to conform to the dashboard 70 of the vehicle. The second cushion portion 130 may be larger than the first cushion portion 120.

As previously mentioned, the first and second cushion portions 120, 130 can be in fluid communication with each other. The fluid communication may be provided by a vent 142 that can permit inflation gas to pass freely between the first and second cushion portions 120, 130. In the illustrated embodiment, the vent 142 is a unidirectional vent or adaptively closeable vent in a side panel of the first cushion portion 120. More particularly, the vent 142 may be positioned directly between the first and second inflatable chambers 122, 132, and thus may provide direct fluid communication from the first inflatable chamber 122 to the second inflatable chamber 132.

The vent 142 provides one-way venting of inflation gases from the first inflatable chamber 122 to the second inflatable chamber 132 or otherwise prevents backflow of inflation gases from the second inflatable chamber 132 to the first inflatable chamber 122. The vent 142 may be a unidirectional vent that permits flow of inflation gas from the first inflatable chamber 122 to the second inflatable chamber 132 and restricts flow of inflation gas from the second inflatable chamber 132 to the first inflatable chamber 122.

In certain embodiments, the vent 142 may include a cinch tube. An example of a vent 142 including a cinch tube is shown in FIGS. 4-6, 7A, and 7B, and discussed below with reference to the same. In certain other embodiments, the vent 142 may include a gas guide around the one or more apertures and extending into the second inflatable chamber 132. An example of a vent 142 including a gas guide is shown in FIGS. 8, 9, 10A, 10B, 11A, 11B, 12, 13A and 13B and discussed below with reference to the same.

When the airbag cushion 110 is fully deployed, the first cushion portion 120 can be positioned directly in front of the occupant 60 and the second cushion portion 130 can extend laterally, in an inboard direction, from the first cushion portion 120. For example, in some embodiments, the second cushion portion 130 may be configured to cover the IP stack region 71 (see FIG. 2) of the dashboard 70. The first cushion portion 120 may be connected to the second cushion portion 130 in any suitable manner, such as via one or more seams (e.g., one or more lines of stitching, welds, and/or adhesives).

In the illustrated embodiment, the first cushion portion 120 defines a first inflatable chamber 122 that is configured to receive inflation gas from the inflator 112. The first cushion portion 120 can thereby inflate and expand from a compact state to a deployed state. The second cushion portion 130 defines a second inflatable chamber 132 that is configured to receive inflation gas from the first inflatable chamber 122. Stated otherwise, the second cushion portion 130 may be in fluid communication with the first cushion portion 120 so that the second inflatable chamber 132 receives inflation gas directly from the first inflatable chamber 122 via the vent 142. The second inflatable chamber 132 may be said to receive inflation gas indirectly from the inflator 112 via the first inflatable chamber 122. The second cushion portion 130 can thereby inflate and expand from a compact state to a deployed state.

The airbag assembly 100 illustrated in FIG. 1 is deployed to receive the vehicle occupant 60. The occupant 60 is shown seated in a seat 54 configured to accommodate a single person (e.g., a bucket seat). The seat 54 may provide a well-defined vehicle occupant region 57, which may also be referred to herein as a vehicle occupant position, within which the vehicle occupant 60 is generally positioned while in the seat 54. As previously mentioned, the first cushion portion 120 can be configured to deploy directly in front of the vehicle occupant region 57 and/or toward the vehicle occupant region 57. Stated otherwise, in some instances, the deployment of the first cushion portion 120 may follow a trajectory that is not in a straight line toward the vehicle occupant region 57, such as by expanding upwardly toward a windshield 52 of the vehicle 50 and/or downwardly toward a floor of the vehicle 50. However, a general deployment of the first cushion portion 120 may nevertheless be generally rearward toward the vehicle occupant region 57.

In operation, the airbag assembly 100 can be deployed when the vehicle 50 is involved in a collision. As discussed in greater detail below, the first cushion portion 120 of the airbag 110 can be configured to deploy prior to deployment of the second cushion portion 130. The first cushion portion 120 can deploy in a direction toward the vehicle occupant 60 in any suitable manner. For example, the first cushion portion 120 can deploy generally as a typical passenger airbag, which does not include a supplemental chamber, might deploy. In the illustrated embodiment, the second cushion portion 130 receives inflation gas from a first cushion portion 120 to inflate, expand, and extend from the first cushion portion 120 laterally toward the driver's side of the vehicle 50.

In some instances, when the vehicle 50 is involved in a collision that causes the occupant 60 to move primarily or substantially exclusively in a forward direction toward the dashboard 70, the first cushion portion 120 may receive the vehicle occupant 60 in a typical fashion. The forward direction is depicted by the arrow 40. The forward direction 40 may be a forward direction of travel of the vehicle 50. In other instances, the vehicle 50 can be involved in a collision that causes the occupant 60 to move in both the forward direction 40 and an inboard direction (e.g., toward the center of the vehicle 50 or toward the driver side of the vehicle 50, in an oblique direction relative to the forward direction). The second cushion portion 130 can provide an additional cushioning region for the occupant 60 in such instances. For example, in some circumstances, the occupant 60 may miss the first cushion portion 120 but may be received by the second cushion portion 130. In other or further circumstances, the first cushion portion 120 may roll as the occupant 60 engages an inboard corner thereof such that the occupant 60 does not fully engage the first cushion portion 120 and may then be received by the second cushion portion 130. In still other or further circumstances, the second cushion portion 130 may stabilize the first cushion portion 120 to make the first cushion portion 120 resistant to rolling or otherwise missing the occupant 60 as the occupant 60 travels in an angled (oblique) forward/inboard direction.

Figure 2:
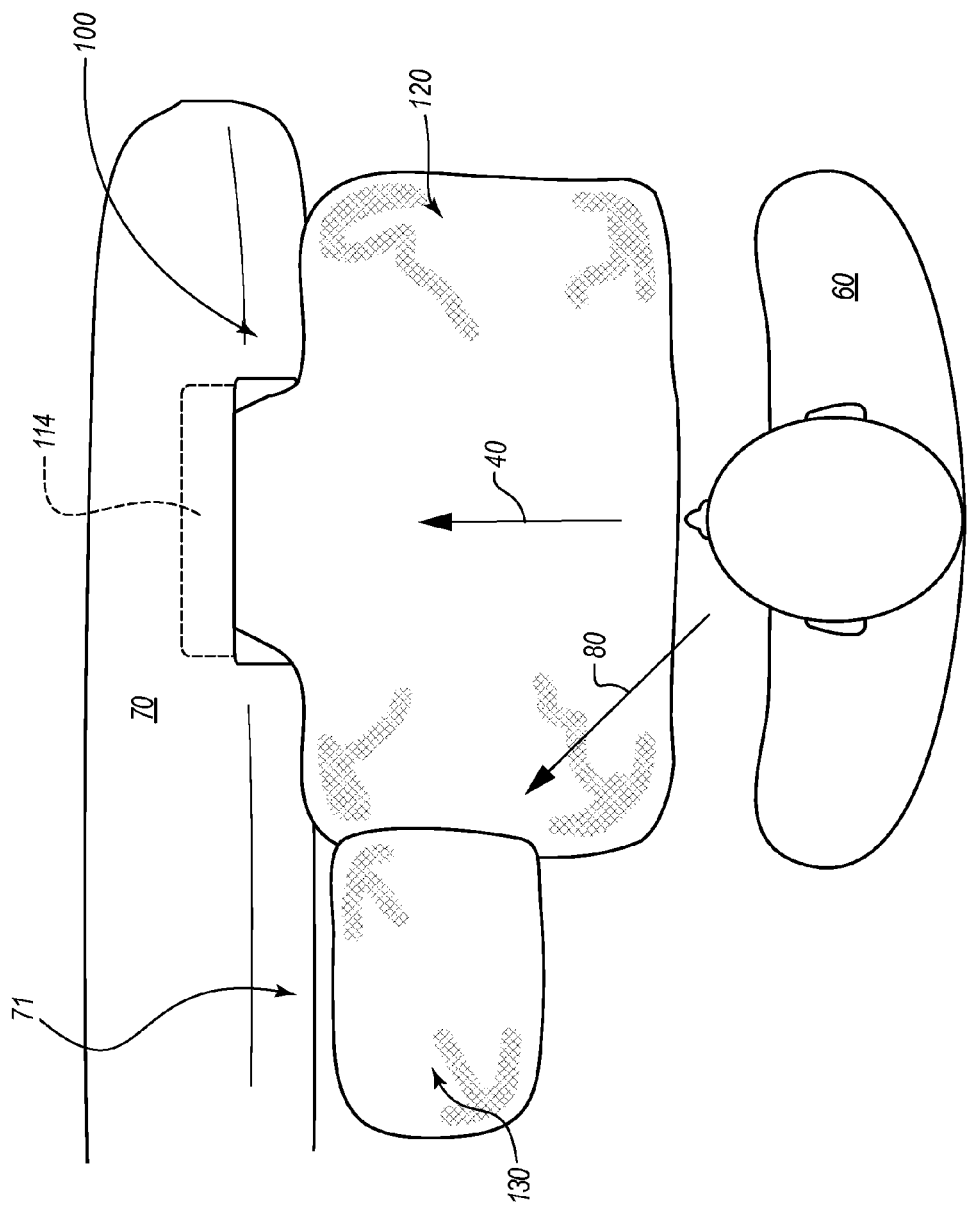
FIG. 2 is a top plan view of the airbag assembly of FIG. 1 deployed in a different collision event, in which the vehicle occupant is depicted moving toward the deployed airbag assembly in an oblique direction relative to a direction of travel of the vehicle.

FIG. 2 depicts the airbag assembly 100 in a deployed state due to a collision event that causes the torso of the occupant 60 to travel in an angled forward/inboard direction such as that just described. The angled direction, which may also be referred to as an oblique direction, is depicted by the arrow 80. In the illustrated embodiment, the first cushion portion 120 deploys from the instrument panel 70 in a first direction toward an occupant 60 seated in front of the airbag housing 114. In this manner, the first cushion portion 120 is prepared to receive the occupant 60, and would do so in a typical fashion if the vehicle occupant 60 were to move primarily in the forward direction 40 (i.e., toward the front of the vehicle 50), such as depicted in FIG. 1. However, the angled movement of the occupant 60 may prevent the occupant 60 from adequately engaging with the first cushion portion 120.

As shown in FIG. 2, the deployed second cushion portion 130 extends laterally from a first cushion portion 120 toward the driver's side of a vehicle 50. A front face of the second cushion portion 130 can be positioned adjacent to the dashboard 70 when the second cushion portion 130 is inflated. Such an orientation of the second cushion portion 130 can assist in stabilizing the first cushion portion 120. In other or further arrangements, such an orientation can permit the second cushion portion 130 to readily receive the occupant 60 if the occupant 60 bypasses or is not fully stopped by the first cushion portion 120. The second cushion portion 130 may thus shield the occupant 60 from harmful contact with the dashboard 70, and in some instances, may be oriented in such a manner to shield the occupant 60 from harmful contact with the IP stack region 71 of the dashboard 70. In the illustrated embodiment, the IP stack region 71 is illustrated as being substantially flush with adjacent outboard portions of the dashboard 70. Similarly, the rear face of the second cushion portion 130 may be substantially flush with the IP stack region 71 of the dashboard 70. In other embodiments, the IP stack region 71 may project rearwardly within the cabin of the vehicle 50. In certain of such embodiments, the rear face of the second cushion portion 130 may be positioned rearwardly (e.g., toward a rearward end of the vehicle 50) relative to a rear face of the first cushion portion 120.

The deployed second cushion portion 130 can receive the vehicle occupant 60 if the occupant 60 misses the first cushion portion 120. In other or further circumstances, the first cushion portion 120 may roll as the occupant 60 engages an inboard corner thereof such that the occupant 60 does not fully engage the first cushion portion 120 and may then be received by the second cushion portion 130. In still other or further circumstances, the second cushion portion 130 may stabilize the first cushion portion 120 to make the first cushion portion 120 resistant to rolling or otherwise missing the occupant 60 as the occupant 60 travels in an angled forward/inboard direction 80.

Figure 3:
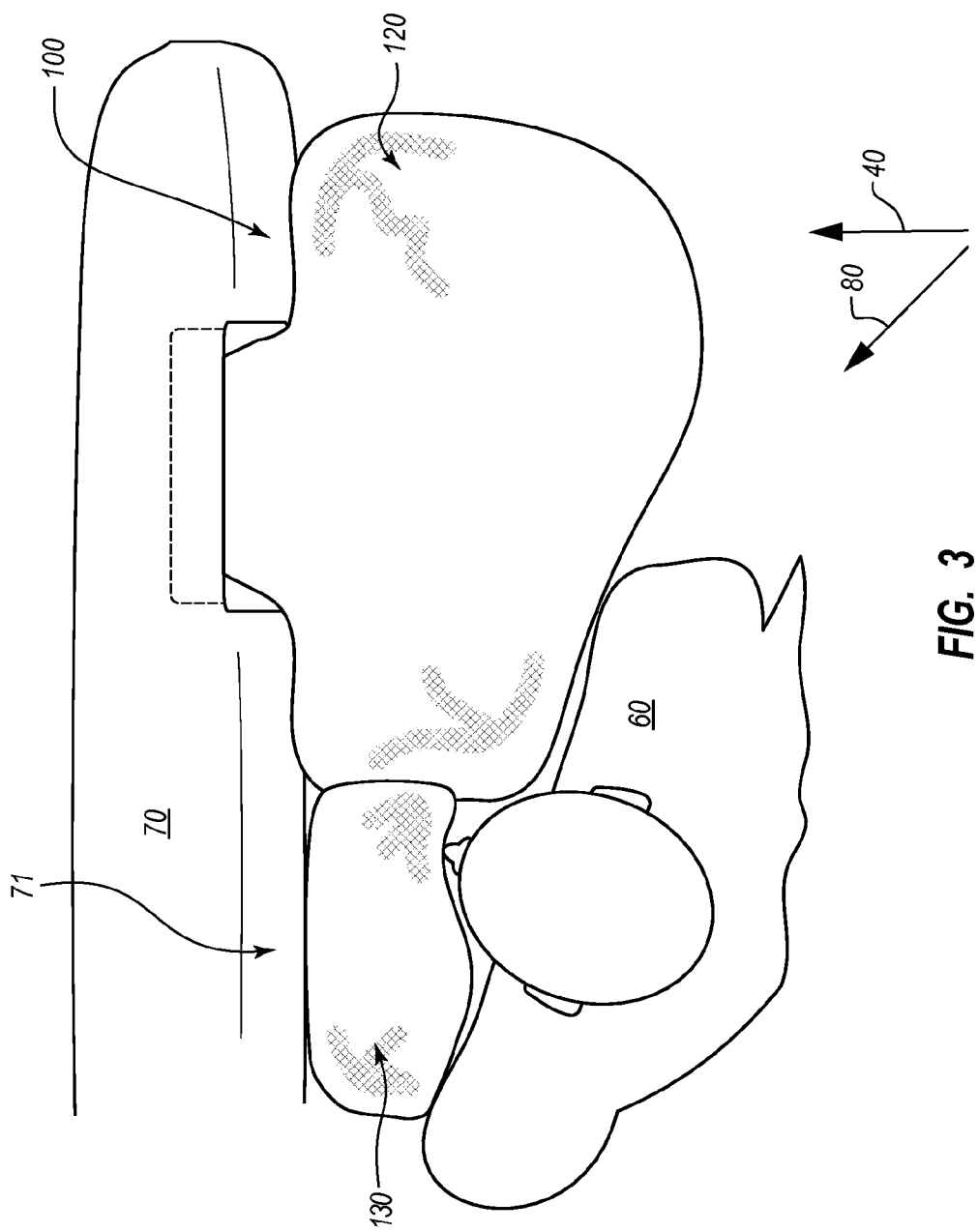
FIG. 3 is a top plan view of the airbag assembly of FIG. 1 that depicts a subsequent position of the vehicle occupant, as compared to FIG. 2, in which the multi-chambered airbag cushions the vehicle occupant.

FIG. 3 depicts the vehicle occupant 60 at a later stage of travel in the angled forward/inboard direction 80 at interaction with the deployed airbag assembly 100. In the illustrated embodiment, the torso of the occupant 60 has only partially engaged with the first cushion portion 120, while another portion of the torso has either deflected off of or bypassed the first cushion portion 120 to engage the second cushion portion 130, due to the movement of the occupant 60 in the oblique direction 80 (i.e., oblique relative to the forward direction 40). The head of the occupant 60 is also shown being received by the second cushion portion 130. In some instances, when the occupant 60 contacts an inboard region of the first cushion portion 120, it may cause the head of the occupant 60 to rotate in an outboard direction (e.g., toward the passenger door). The second cushion portion 130 may reduce or prevent such rotational movement, which might otherwise result in or contribute to kinematic rotational brain injury. In some instances, an effectiveness of the airbag cushion 110 at reducing such brain injury can be sensitive to a position at which the head of the occupant 60 originally contacts the airbag cushion 110. The configuration of the second cushion portion 130 may be determined in view of this relationship, in some instances.

In some collision scenarios, the shoulder restraint portion of the seatbelt 56 (see FIG. 1) may slip off of the shoulder (e.g., the right shoulder) of the occupant 60 due to the oblique movement of the occupant 60. With little or no restraint provided by the seatbelt 56 to inhibit movement of the torso of the occupant 60 along an oblique trajectory, it may be particularly desirable for the airbag cushion 110 to be configured to cushion the occupant 60, or the portion thereof, that bypasses the first cushion portion 120 to prevent hard contact of the occupant 60 with the instrument panel 70.

In the illustrated embodiment, the head and left shoulder of the occupant 60 are protected from harmful contact with the dashboard 70 by the second cushion portion 130. In other instances, the second cushion portion 130 may protect other body portions of the occupant 60 due to the nature of the collision; the size, shape, and/or initial position of the occupant 60; the configuration of the second cushion portion 130; etc. In some embodiments, the second cushion portion 130 is configured to primarily cushion the head of the vehicle occupant 60.

In some embodiments, it may be desirable for the head of the occupant 60 to "pocket" within the second cushion portion 130. For example, in the illustrated embodiment, the head is shown within a depression of the second cushion portion 130, which may also be referred to as a pocket. Such an arrangement may stabilize the head during ridedown and/or may reduce rotational velocities of the head. Such a reduction in rotational velocities of the head may advantageously reduce the risk of brain injury.

The vent 142 may be a unidirectional vent configured to isolate and maintain inflation pressure in the second inflatable chamber 132, separate from the first inflatable chamber 122, once equalization of pressure in the first and second inflatable chambers 122, 132 is achieved. As mentioned above, the vent 142 may be configured to permit venting of inflation gases from the first inflatable chamber 122 to the second inflatable chamber 132 and yet restrict flow of inflation gas from the second inflatable chamber 132 to the first inflatable chamber 122. The size, shape, or any other configuration of the vent 142 may be selected to tune inflation or pressurization rate within the second inflatable chamber 132. In some embodiments, the vent 142 is sized (e.g., is relatively large) to permit a relatively large volume of inflation gas to readily pass from the first inflatable chamber 122 into the second inflatable chamber 132.

In some instances, differently sized occupants may interact with the airbag 110 differently when the vehicle 50 undergoes identical collision events. For example, in some instances, an occupant 60 who is larger than the occupant depicted in FIGS. 1-3 may be received almost exclusively via the first cushion portion 120. For example, the head and torso of the larger occupant 60 may be received by the first cushion portion 120. In such circumstances, the second cushion portion 130 may nevertheless assist in stabilizing the first cushion portion 120 and in preventing the occupant 60 from slipping off of the first cushion portion 120 or missing the first cushion portion 120 due to bouncing or other instability of the first cushion portion 120.

The airbag assembly shown in FIGS. 2 and 3, like other embodiments disclosed herein, may protect an occupant 60 (and, in particular, the occupant's head) from contact with hard surfaces, including, for example, the instrument panel (including the center stack 71 of an instrument panel 70). In other embodiments, the second cushion portion 130 may be attached to the first cushion portion 120 at other positions to prevent contact with other portions of the vehicle 50. For example, in other or further embodiments, a second cushion portion 130 may be positioned at an outboard side of the first cushion portion 120. Such a location of the second cushion portion 130 may assist in preventing harmful contact with the windshield 52, an A-pillar, and/or portions of a door of the vehicle 50, such as when the vehicle occupant 60 is moved in an oblique direction 80 that is both in a forward direction and an outboard direction. In other or further embodiments, one or more second cushion portions 130 may be positioned at a bottom end of the first cushion portion 120 to shield the knees of the occupant 60. In other or further embodiments, one or more second cushion portions 130 may be positioned at a top end of the first cushion portion 120. Any suitable number and/or combination of secondary cushion portions 130 that extend from the primary cushion portion 120 are contemplated.

Figure 4:
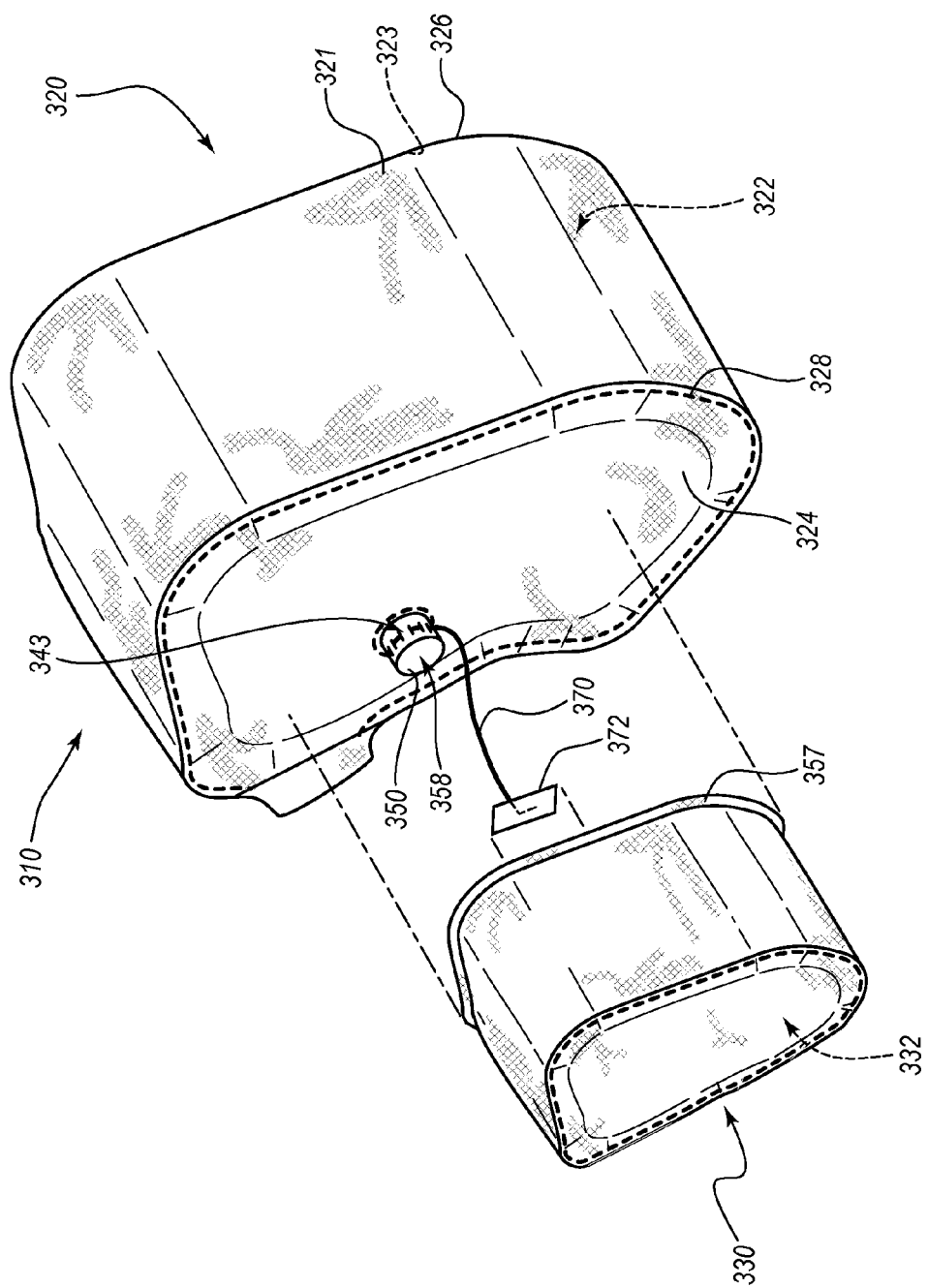
FIG. 4 is an exploded perspective view of a multi-chamber airbag of an airbag assembly, with a primary cushion and a supplemental cushion both shown in an expanded state. A vent to provide fluid communication between the pair of inflatable chambers is shown.

FIG. 4 depicts another embodiment of an airbag 310 that can resemble the airbag 110 described above in certain respects. Accordingly, like features are designated with like reference numerals, with the leading digits incremented to "3." Relevant disclosure set forth above regarding similarly identified features thus may not be repeated hereafter. Moreover, specific features of the airbag 310 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag 310. Any suitable combination of the features and variations of the same described with respect to the airbag 110 can be employed with the airbag 310, and vice versa. Similarly, the airbag 310 can be used with any suitable airbag assembly, including the airbag assembly 100 discussed above. This pattern of disclosure applies equally to further embodiments depicted in subsequent figures and described hereafter, wherein the leading digits may be further incremented.

FIG. 4 is an exploded perspective view of a multi-chamber airbag 310 of an airbag assembly, with a first cushion portion 320 and a second cushion portion 330 both shown in an expanded state. A vent 343 provides one-way fluid communication between an inflatable chamber 322 of the first cushion portion 320 and an inflatable chamber 332 of the second cushion portion 330. FIG. 4 illustrates a manner in which the first cushion portion 320 can be connected with the second cushion portion 330. For example, in the illustrated embodiment, the first cushion portion 320 includes a rear panel 321 (which may be part of a main panel), a first side panel 323, and a second side panel 324. The first side panel 323 is joined to the rear panel 321 by seam 326, and the second side panel 324 is joined to the rear panel 321 by seam 328. Seams 326 and 328 may be of any suitable variety, whether sealed or unsealed seams, and may be formed via stitching, one or more adhesives, taping, welding (e.g., radio frequency welding), heat sealing, or any other suitable technique or combination of techniques. The panels 321, 323, 324 may be formed of any suitable material. For example, in some embodiments, panels are formed of woven nylon fabric. Moreover, a variety of types and configurations of airbag panels can be utilized in various embodiments. For example, the size, shape, proportions, number, and connectivity of the panels may vary in different embodiments. Some embodiments may be tailored for use in different vehicles and/or for different locations within a vehicle.

The second cushion portion 330 may be attached to the side panel 324 of the first cushion portion 320 in any suitable manner. A portion of the side panel 324 may separate the first inflatable chamber 322 from the second inflatable chamber 332 and thus may be referred to as a partition. In the illustrated embodiment, the second cushion portion 330 is attached via a seam 357. The size and position of the seam 357 can be such that the seam 357 is substantially circumscribed by the perimeter seam 328. Stated otherwise, the seam 357 can be spaced from the perimeter seam 328 such that the periphery of the second cushion portion 330 is secured to the side panel 324 of the first cushion portion 320 via the stitching at a position internal to the periphery of the first cushion portion 320. In other embodiments, at least a portion of the second cushion portion 330 may be joined to the first cushion portion 320 via the perimeter seam 328.

The vent 343 can provide one-way fluid communication between the first inflatable chamber 322 and the second inflatable chamber 332. Thus, during a deployment event, inflation gases may travel from the first inflatable chamber 322 through the vent 343 into the second inflatable chamber 332. A perimeter of the vent 343 may be defined by a seam that joins the first and the second inflatable chambers 322, 332 to each other.

In the illustrated embodiment of FIG. 4, the vent 343 may include a cinch tube 350 and a tether 370 configured to activate and close the cinch tube 350. The cinch tube 350 may define and/or surround an aperture 358 of the vent 343. The tether 370 is coupled to the cinch tube 350 at a first end and may extend around a majority of the aperture 358. The tether 370 is coupled at an opposite second end to the second cushion portion 330 at a position within the second inflatable chamber 332. The tether 370 has a length that permits the cinch tube 350 to remain open when the tether 370 is slack and to be drawn together to close the aperture 358 as the tether 370 becomes taut. Specifically, drawing the tether 370 taut draws the rim together to close the aperture 358.

The cinch tube 350 may be a tube with a base end opposite from a terminal end. The cinch tube 350 may include a sleeve with holes referred to as sleeve apertures. The tether 370 may be received by the sleeve apertures. The aperture 358 of the vent 343 is defined by the inner diameter of the cinch tube 350. The cinch tube 350 may be embodied with a generally cylindrical shape. The cinch tube 350 may have any suitable shape such as rectangular, triangular, or polygon shapes. The cinch tube 350 may be embodied with a height (e.g., extend into the second inflatable chamber 332) that is sufficient to achieve desired closure. In one embodiment, the cinch tube 350 has a height which is about half of its diameter. Selecting an appropriate height to diameter ratio permits the cinch tube 350 to close during cinching without resistance from cushion membrane tension. The design permits the cinch tube 350 to be a low-stress element in the cushion assembly, which is helpful during unfolding of the cushion and pressurization. The cinch tube 350 may comprise a nylon woven fabric-type or other suitable material known in the art.

Figure 5:
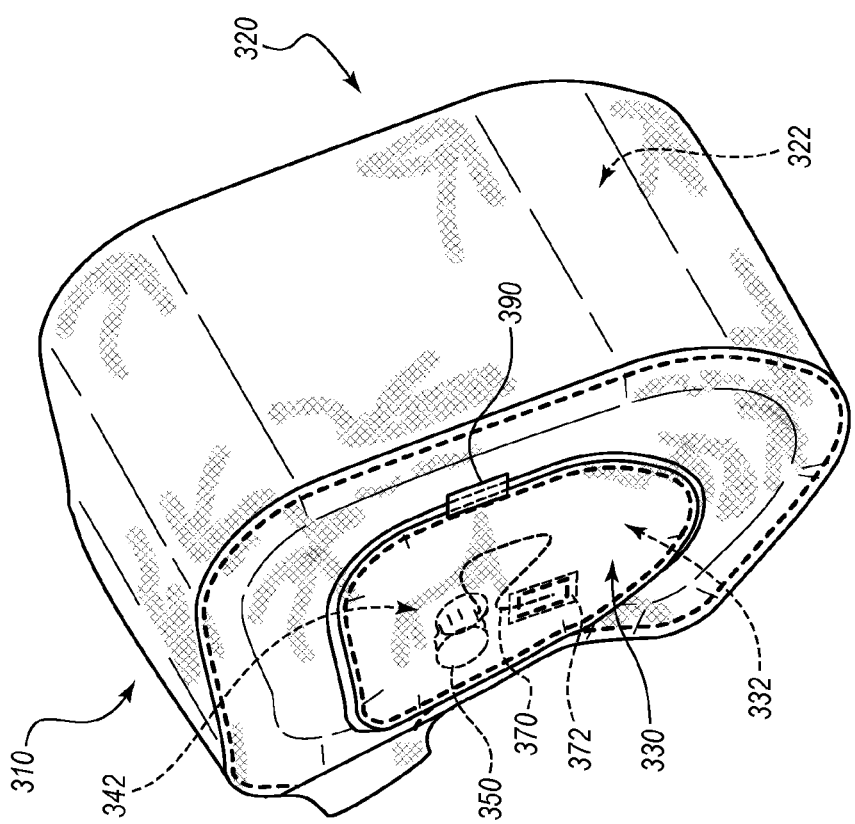
FIG. 5 is a perspective view of the multi-chamber airbag of FIG. 4 with a primary cushion in an expanded state and a supplemental cushion in an uncompressed packaged state or storage state.

FIG. 5 is a perspective view of the multi-chamber airbag 310 of FIG. 4 in an assembled state with the first cushion portion 320 in an expanded state and the second cushion portion 330 in an uncompressed packaged state or storage state (e.g., prior to expansion). In certain embodiments, the first cushion portion 320 may inflate and expand before the second cushion portion 330 begins expanding, as shown in FIG. 5. The airbag 310 may include a temporary fastener 390 configured to maintain the second cushion portion 330 in a compact state during partial or complete expansion of the first cushion portion 320 from a compact state to a deployed state. In other embodiments, the temporary fastener 390 is configured to maintain a second cushion portion 330 in the compact state during only an initial portion of expansion of a first cushion portion 320 (e.g., the second cushion portion 330 can begin to inflate prior to full deployment of the first cushion portion 320). A strength of the temporary fastener 390 can be selected to achieve the desired deployment characteristics of the airbag 310. In various embodiments, the temporary fastener 390 can comprise one or more of stitching (e.g., one or more break stitches or tack stitches), adhesive, hook-and-pile fasteners, and/or other suitable fasteners.

The temporary fastener 390 can be configured to release the second cushion portion 330 to permit expansion of the second cushion portion 330 at a desired stage of deployment. For example, the temporary fastener 390 can be configured to release the second cushion portion 330 when a threshold pressure is reached at an interior of the airbag 310. In other or further embodiments, the temporary fastener 390 is used to achieve a desired deployment pattern for the airbag 310. In still other or further embodiments, the temporary fastener 390 is used to assist with packaging of the airbag 310, such as by retaining the second cushion portion 330 in a suitable position for folding or rolling. In some embodiments, the temporary fastener 390 can be used to provide a desired deployment trajectory for the second cushion portion 330.

Upon the inflation pressurization in the first cushion portion 320 reaching a desired level, inflation gases may begin venting from the first inflatable chamber 322 through the vent 343 to the second inflatable chamber 332. In the illustrated embodiment of FIG. 5, inflation gases begin venting through the open cinch tube 350 into the second inflatable chamber 332. The tether 370 is in a slack state, allowing the cinch tube 350 to be open.

Figure 6:
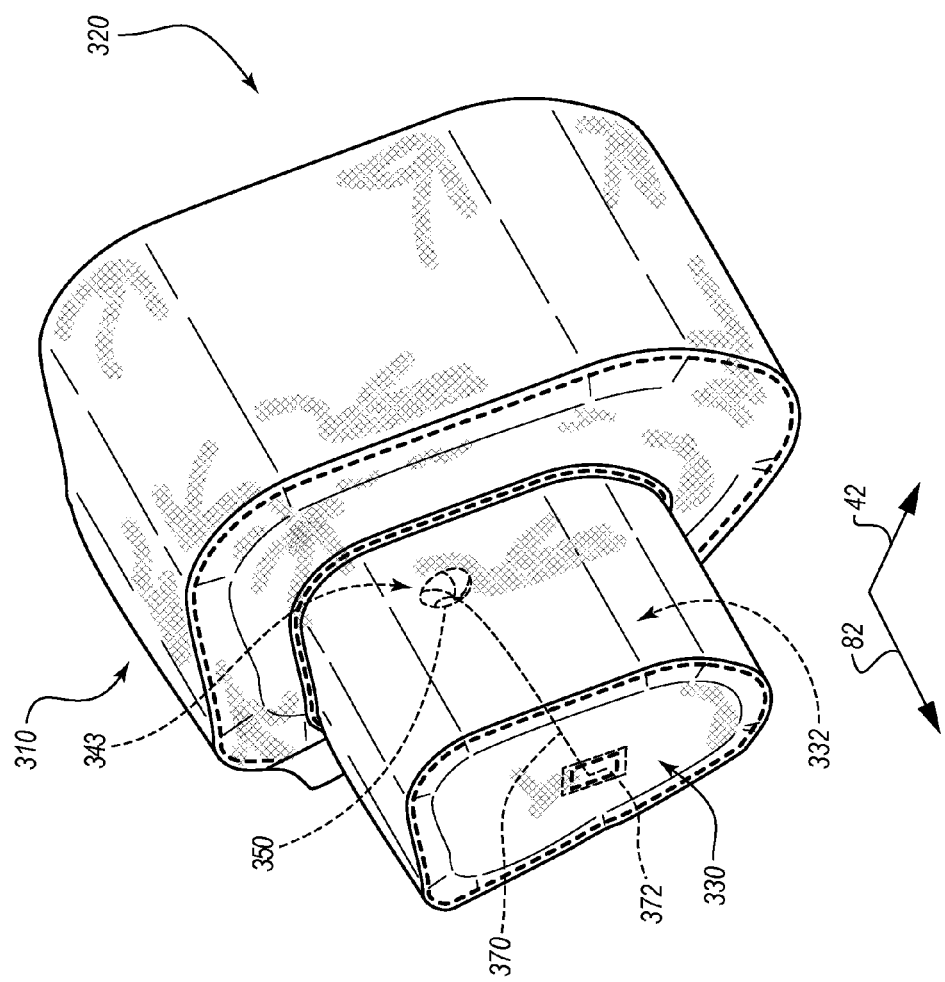
FIG. 6 is a perspective view of the multi-chamber airbag in the assembled state shown in FIG. 5 with the primary cushion and the supplemental cushion in an expanded state.

FIG. 6 is a perspective view of the multi-chamber airbag 310 with the first cushion portion 320 and the second cushion portion 330 in an expanded state. As the second cushion portion 330 inflates and expands, the tether 370 is drawn taut. The tether 370 is coupled to a sidewall of the second inflatable chamber 332 by a tether attachment 372. Inflation and expansion of the second cushion portion 330 causes the tether attachment 372 and a second end of the tether 370 opposite from a first end coupled to the cinch tube 350 to move away from the cinch tube and thereby draw the tether 370 taut. Drawing the tether 370 taut causes the cinch tube 350 to close the valve 343, as shown in FIG. 6.

Once the cinch tube 350 is cinched and the valve 343 is closed, the second inflatable chamber 332 is no longer in fluid communication with the first inflatable chamber 322. With the vent 343 closed, inflation gases within the second inflatable chamber 332 are isolated (or nearly isolated) from inflation gases within the first inflatable chamber 322. Accordingly, impact of an occupant 60, for example, with either the first cushion portion 320 or the second cushion portion 330 would not result in a shift of inflation gases from one inflatable chamber 322, 332 to the other. Integrity and/or restraint capability of the second cushion portion 330 is retained independent of changes to or within the first cushion portion 320. In certain embodiments, the second cushion portion 330 of the airbag 310 may be devoid of external vents and, thus, the second inflatable chamber 332 is isolated from external gases once the vent 343 is closed. In certain embodiments, the first cushion portion 320 of the airbag 310 may be devoid of external vents.

The first cushion portion 320 of the multi-chamber airbag 310 illustrated in FIG. 6 may deploy in a first direction indicated by arrow 42 (e.g., toward an occupant). FIG. 6 illustrates that the second cushion portion 330 may deploy in a second direction indicated by arrow 82, for example, laterally from the first cushion portion 320. In certain embodiments, the second direction 82 may be orthogonal, or substantially orthogonal, to the first direction 42. The second direction 82 may be laterally inboard along a dashboard 70 of a vehicle 50, for example, to cover a portion of the dashboard 70 laterally spaced closer to a center of the vehicle 50 from a portion of the dashboard 70 that is covered by the first cushion portion 320.

Other configurations are possible. In certain embodiments, the second airbag portion 330 may deploy in a second direction that may be downward (e.g., such as in a knee airbag). In other embodiments, the second airbag portion 330 may deploy in a second direction that may be laterally outboard, toward the outside of the vehicle.

Figure 7A:
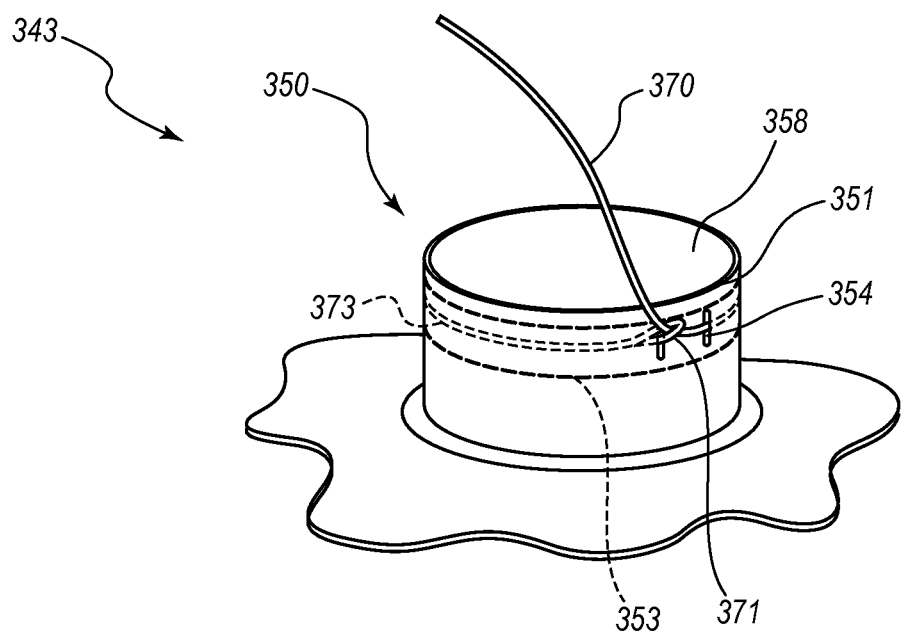
FIG. 7A is a perspective view of a vent including a cinch tube, according to one embodiment, in an open configuration.
Figure 7B:
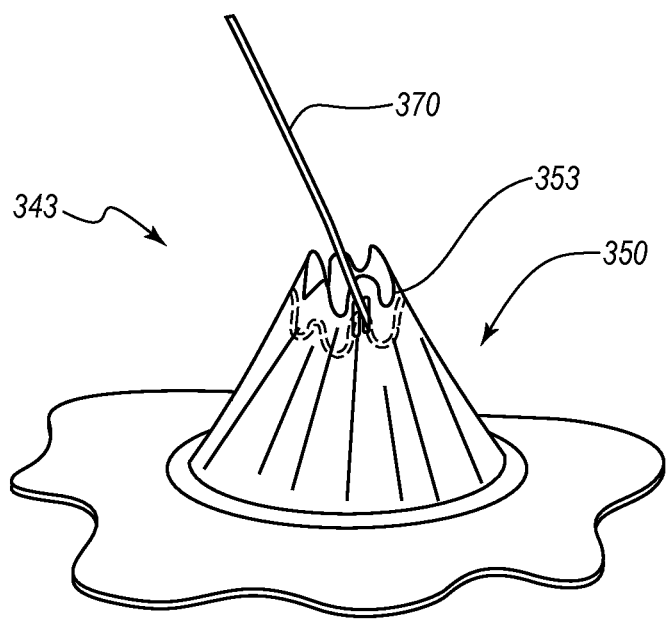
FIG. 7B is a perspective view of the cinch tube of the vent of FIG. 7A in a closed configuration.

FIGS. 7A and 7B illustrate close-up and more detailed views of a cinch tube 350, according to one embodiment. FIG. 7A is a perspective view of a vent 343 including a cinch tube 350, according to one embodiment, in an open configuration. FIG. 7B is a perspective view of the cinch tube 350 of the vent 343 of FIG. 7A in a closed configuration.

Referring to FIGS. 7A-7B, the vent 343 includes a cinch tube 350 and a tether 370. The illustrated cinch tube 350 includes a sleeve 353 having a base end abutting an interior wall of the cushion and opposite from a terminal end that provides a rim 351 surrounding and/or defining an aperture 358. The tether 370 has an end (e.g., a first end) that is formed into a loop and a vent portion 373 around the majority of the perimeter of cinch tube 350. The sleeve 353 of the cinch tube 350 holds or retains a vent portion 373 of the tether 370. The vent portion 373 enters the sleeve 353 via a sleeve aperture 354. Other configurations can also be utilized such as stitching to hold the end of the tether 370 to the cinch tube 350 or the tether 370 could extend through the sleeve 353 with both ends attached together at a tether attachment point. As shown in FIG. 7B, the sleeve 353 is gathered together when the tether 370 is pulled taut. By causing the cinch tube 350, and particularly the rim 351, to collapse on itself, the vent 343 is closed without necessitating closure of the base end of the cinch tube 350. The terminal end, including the rim 351, may be at least partially within the interior of the second inflatable chamber 332 after the aperture 358 becomes at least partially closed. In other embodiments, the sleeve 353 features numerous apertures to facilitate cinching or a plurality of loops or tabs may collectively act as a tether holder.

Referring again to FIG. 6, as the second cushion portion 330 is inflated, expansion extends a second end of the tether 370 coupled to the interior surface of the second cushion portion 330 until reaching the maximum length of the tether 370, thereby pulling on the first end of the tether 370 and closing the cinch tube 350 and the closeable vent 343. The configuration of the cinch tube 350, such as the ratio of its height to the diameter of the rim 351, in combination with the tether 370, permits the rim 351 of the aperture 358 to be brought together.

The tether 370 is configured to move with the expansion of the second cushion portion 330 to close the vent 343. FIG. 6 shows a second end of the tether 370 opposite from a first end coupled to the cinch tube 350. A tether attachment 379 serves as an anchor for the second end of the tether 370. In the illustrated embodiment, the tether attachment 379 may be a patch to which the second end of the tether 370 is sewn. In another embodiment, the tether attachment 379 is stitching between the second cushion portion 330 and the tether 370. In another embodiment, the tether 370 is moveably anchored to the second cushion portion 330 via the tether attachment 379 which may be a loop that permits movement of the tether 370. In another embodiment, the tether attachment 379 may be disposed elsewhere such as proximate to a different portion of an interior surface. Alternatively, the tether attachment 379 may couple to a portion of an exterior surface. For example, the tether attachment 379 may be attached at an exterior surface of an inboard side of the second cushion portion 330. Thus, the tether 370 may extend through the interior (e.g., the second inflatable chamber 332) of the second cushion portion 330 or may be positioned exterior to the second cushion portion 330. The location of the tether attachment 379 may depend on a deployment angle, vehicle interior geometry, and/or cushion fold type. The tether 370 may comprise a nylon material or other suitable material known in the art.

As illustrated in FIG. 6, the second cushion portion 330 may be configured to extend a distance from the first cushion portion 320 when the airbag 310 is fully inflated. The distance may be selected based on any suitable criteria, such as a width of the first cushion portion 320, or width of the IP stack 71 (see FIG. 2). Other dimensions of the second cushion portion 330 may also be selected to permit suitable coverage of potentially injurious portions of the vehicle 50, such as the IP stack 71 or other portions of the dashboard 70 (see FIGS. 1 and 2).

The deployed first cushion portion 320 can define a volume $V_1$, which may be at least partially defined by interior surfaces of the first cushion portion 320. The deployed second cushion portion 330 can define a volume $V_2$ that is at least partially defined by the interior surfaces of the second cushion portion 330. The first cushion portion 320 can be positioned directly in front of an occupant position within a vehicle 50, as previously stated, and may be configured to be expanded prior to expansion of the second cushion portion 330. In some embodiments, the first and second cushion portions 320, 330 may be configured to fill simultaneously, although one may fill more rapidly than the other. In many embodiments, the volume $V_1$ is greater than the volume $V_2$.

Figure 8:
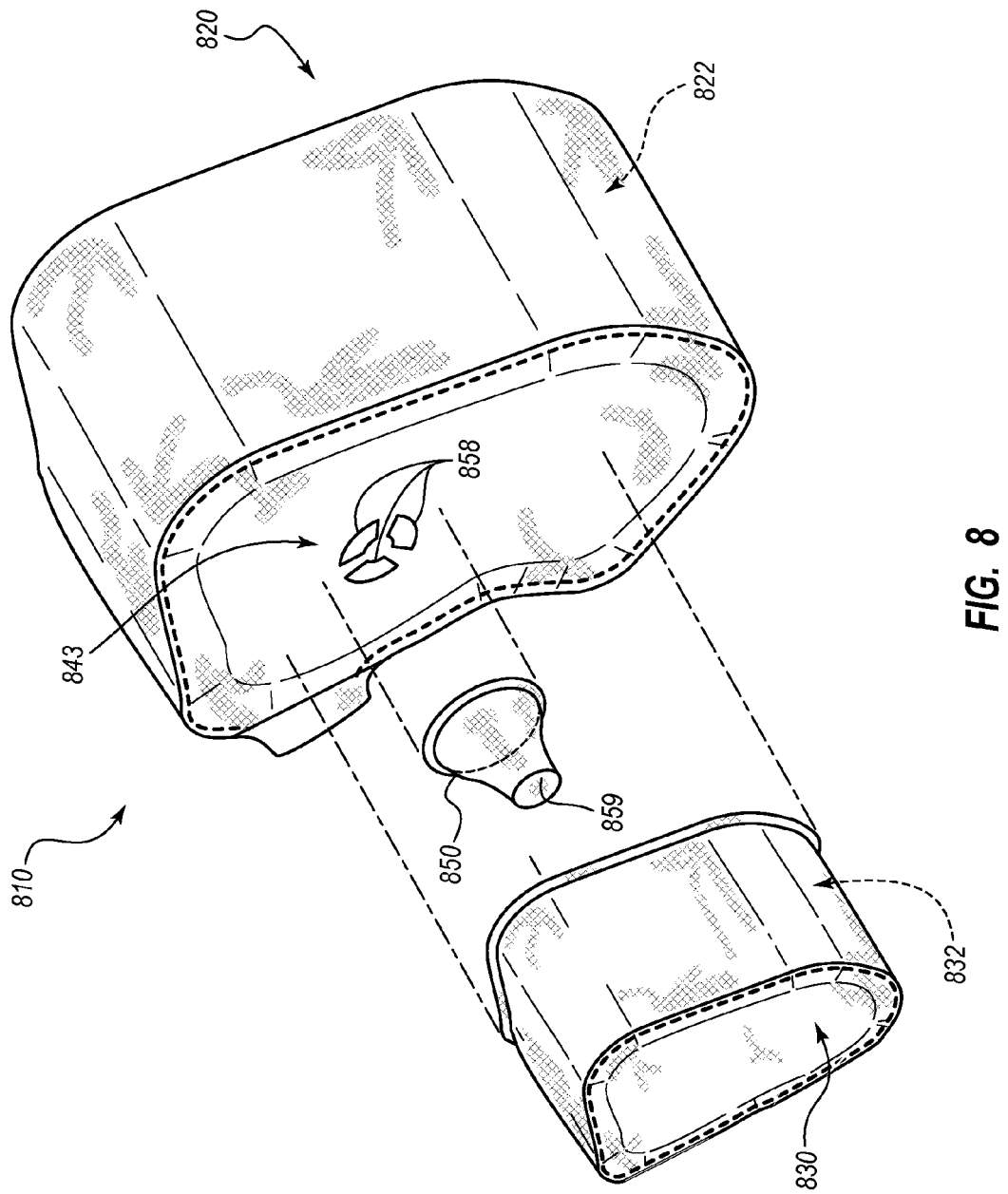
FIG. 8 is an exploded perspective view of a multi-chamber airbag of an airbag assembly, according to another embodiment, with the primary cushion and the supplemental cushion both shown in an expanded state. A vent to provide fluid communication between the pair of inflatable chambers is shown.
Figure 9:
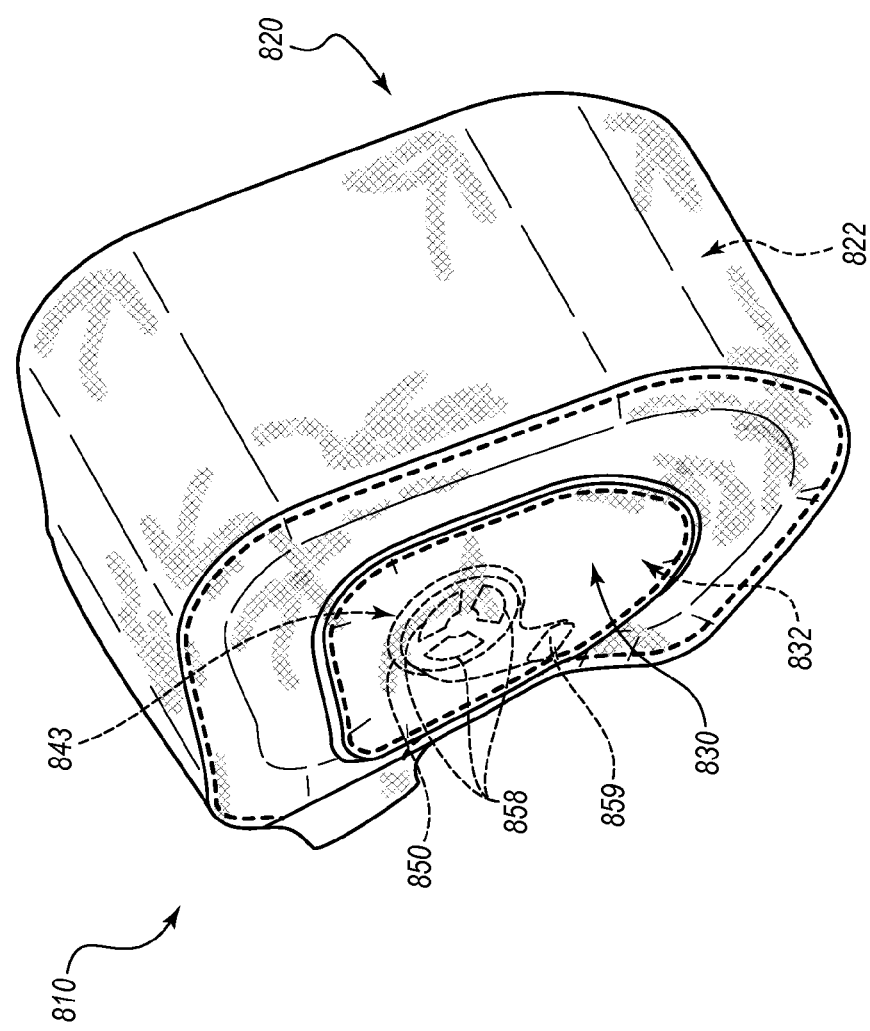
FIG. 9 is a perspective view of the multi-chamber airbag of FIG. 8 with a primary cushion in an expanded state and a supplemental cushion in an uncompressed packaged state or storage state.

FIG. 8 is an exploded perspective view of a multi-chamber airbag 810 of an airbag assembly, according to another embodiment, with a first cushion portion 820 and a second cushion portion 830 both shown in an expanded state. A vent 843 provides fluid communication between an inflatable chamber 822 of the first cushion portion 820 and an inflatable chamber 832 of the second cushion portion 830. FIG. 9 illustrates the multi-chamber airbag 810 of FIG. 8 in an assembled state with the first cushion portion 820 in an expanded state and a second cushion portion 830 in a compressed (unexpanded) storage state (e.g., prior to expansion).

The airbag 810 can resemble the airbag 110 and the airbag 310 described above in certain respects. Accordingly, like features are designated with like reference numerals, with the leading digits incremented to "8." Relevant disclosure set forth above regarding similarly identified features thus may not be repeated hereafter. Moreover, specific features of the airbag 810 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag 810. Any suitable combination of the features and variations of the same described with respect to the airbag 110 and the airbag 310 can be employed with the airbag 810, and vice versa. Similarly, the airbag 810 can be used with any suitable airbag assembly, including the airbag assembly 100 discussed above. This pattern of disclosure applies equally to further embodiments depicted in subsequent figures and described hereafter, wherein the leading digits may be further incremented.

In the illustrated embodiment of FIG. 8, the vent 843 may include one or more apertures 858 and a gas guide 850. The one or more apertures 858 provide fluid communication from the first inflatable chamber 822 to the second inflatable chamber 832. The gas guide 850 may be a sleeve disposed around the one or more apertures 858 and extending into the second inflatable chamber 832 to define a second aperture 859.

Figure 10A:
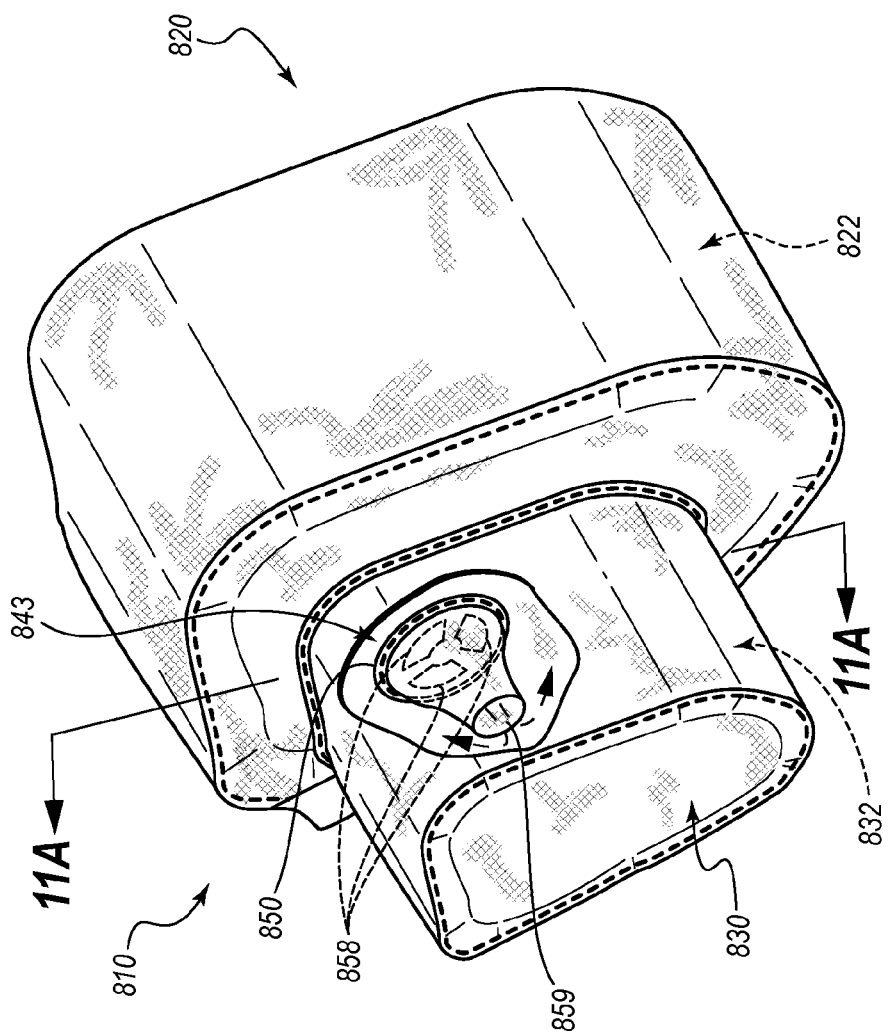
FIG. 10A is a perspective partial cut-away view of the multi-chamber airbag in the assembled state shown in FIG. 9 with the primary cushion in an expanded state and the supplemental cushion expanding with inflation gas passing through the vent.

As shown in FIGS. 10A and 11A, the gas guide 850 may be configured to expand, when pressurization in the first inflatable chamber 822 is greater than pressurization in the second inflatable chamber 832. FIG. 10A illustrates a cut-away view of the multi-chamber airbag 810 with the first cushion portion 820 in an expanded state and the second cushion portion 830 expanding with inflation gas passing through the expanded gas guide 850. FIG. 11A is a sectional view of the multi-chamber airbag shown in FIG. 10A taken along the line 11A-11A. The expanded gas guide 850 may allow inflation gases to vent through the one or more apertures 858, through the expanded gas guide 850, through the second aperture 859 of the gas guide 850, and into the second inflatable chamber 832.

Figure 10B:
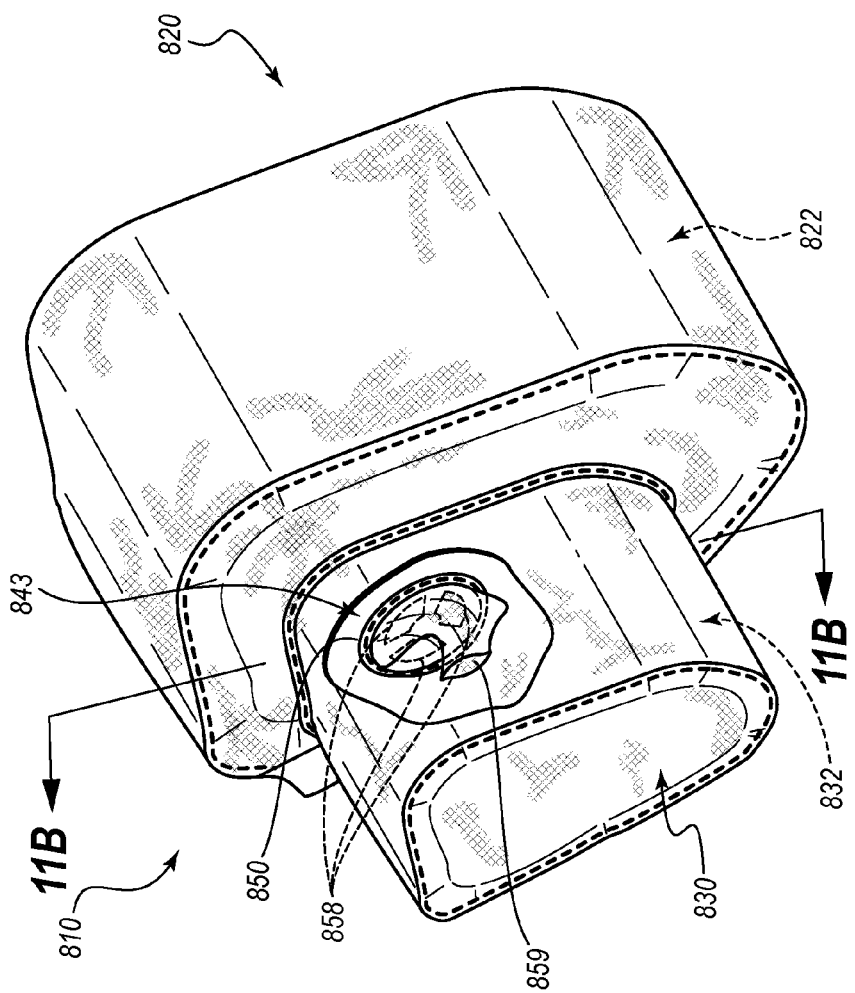
FIG. 10B is a perspective partial cut-away view of the multi-chamber airbag in the assembled state shown in FIG. 9 with the primary cushion and the supplemental cushion in an expanded state and the vent closed.

As shown in FIGS. 10B and 11B, the gas guide 850 also may be configured to collapse upon equalization of inflation gas pressure within the second inflatable chamber 832 with inflation gas pressure within the first inflatable chamber 822. FIG. 10B illustrates the multi-chamber airbag 810 in the assembled state shown in FIG. 9 with the first cushion portion 820 and the second cushion portion 830 both in an expanded state with inflation pressurization in the inflatable chambers 822, 832 equal or greater in the second inflatable chamber 832 than in the first inflatable chamber 822. Accordingly, the gas guide 850 is collapsed and the vent 843 is closed. FIG. 11B is a sectional view of the multi-chamber airbag 810 shown in FIG. 10B taken along the line 11B-11B. The collapsed gas guide 850 (e.g., sleeve) obstructs the one or more apertures 858 and prevents backflow of inflation gases into the first inflatable chamber 822 from the second inflatable chamber 832.

As long as the inflation pressure within the second inflatable chamber 832 equals or exceeds the inflation pressure of the first inflatable chamber 822, inflation gases will stop flowing from the first inflatable chamber 822 to the second inflatable chamber 832 through the one or more apertures 858. As a result, the gas guide 850 will collapse to obstruct reverse venting (from the second inflatable chamber 832 to the first inflatable chamber 822) to thereby isolate the second inflatable chamber 832 from the first inflatable chamber 822.

If at a later point in time the inflation pressure in the first inflatable chamber 822 again rises and exceeds the inflation pressure in the second inflatable chamber 832, inflation gases may again vent in a single direction from the first inflatable chamber 822 to the second inflatable chamber 832 and expand the gas guide 850. However, when the inflation pressure within the second inflatable chamber 832 equals or exceeds the inflation pressure of the first inflatable chamber 822, inflation gases will stop flowing from the first inflatable chamber 822 to the second inflatable chamber 832 through the apertures 858 and the gas guide 850 will again collapse and obstruct the apertures 858 to prevent reverse venting.

In the illustrated embodiment of vent 843, the apertures 858 may be sufficiently small to restrict or even prevent the sleeve of the gas guide 850 from inverting through an aperture of the one or more apertures 858 into the first inflatable chamber 822.

Figure 12:
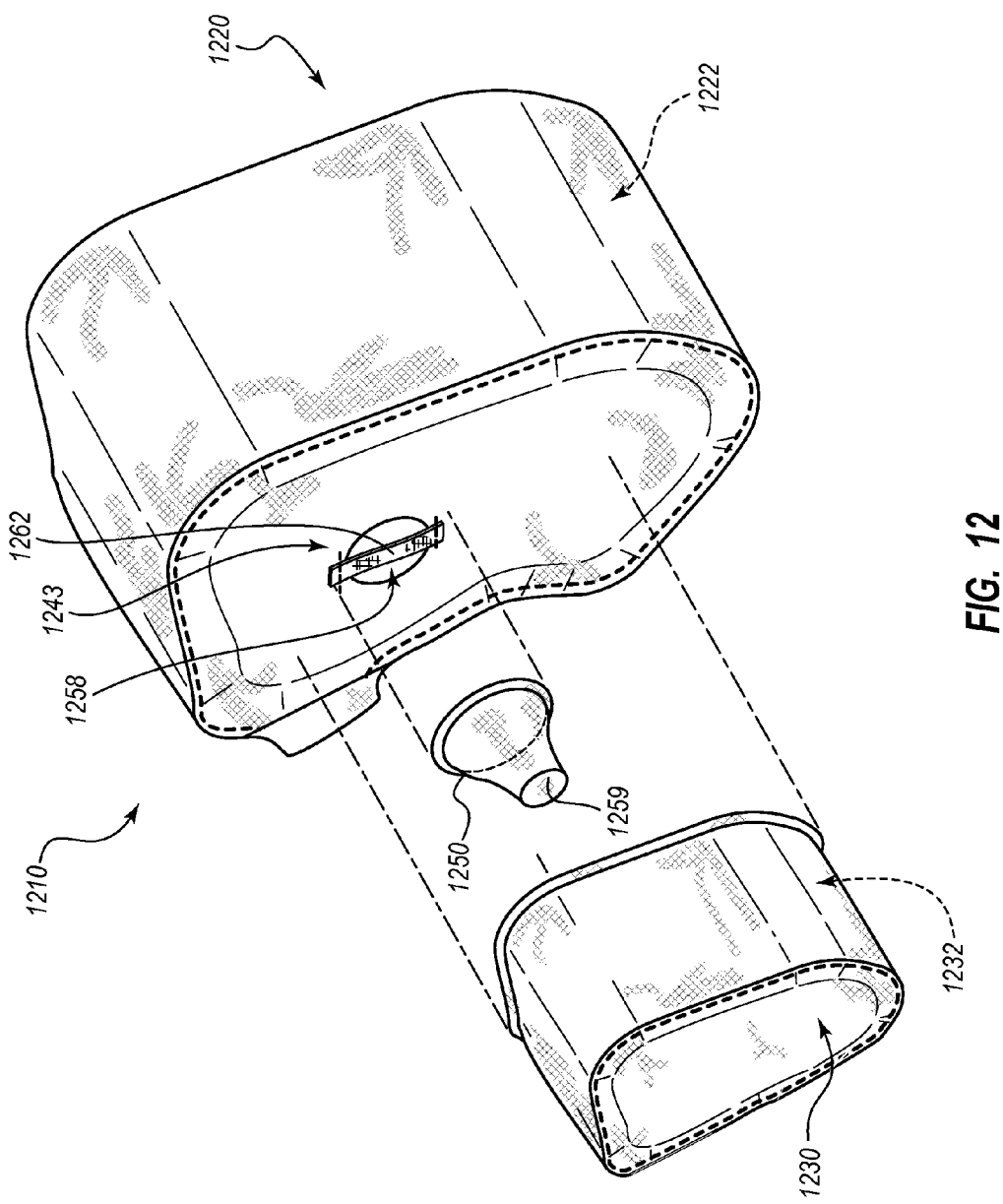
FIG. 12 is an exploded perspective view of a multi-chamber airbag of an airbag assembly, according to another embodiment.

FIG. 12 illustrates an embodiment of a multi-chamber airbag 1210 with a vent 1243 that may include a larger aperture 1258 and a gas guide 1250. The vent 1243, in other embodiments, may include multiple larger apertures. A strap 1262 may extend across the larger aperture(s) 1258. The strap 1262 may be disposed between the gas guide 1250 and a first inflatable chamber 1222 to prevent the gas guide 1250 from inverting through such larger aperture(s) 1258 into the first inflatable chamber 1222.

Figure 13B:
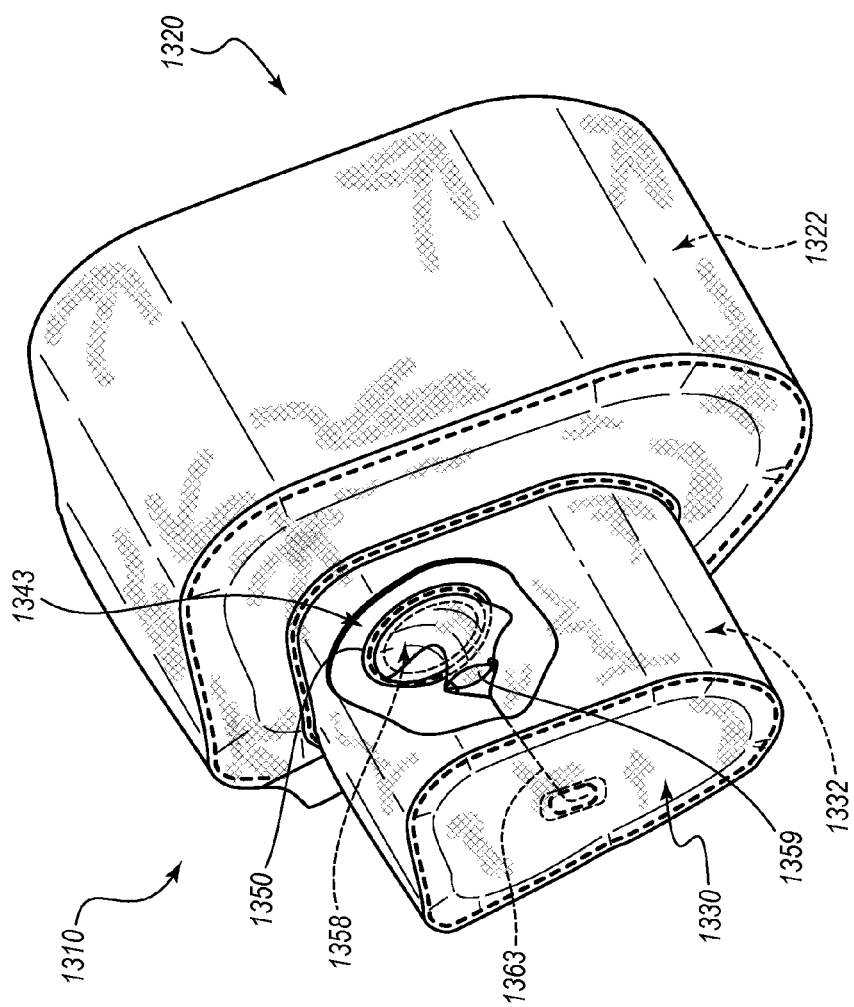
FIG. 13B is a perspective partial cut-away view of the multi-chamber airbag of FIG. 13A with the unidirectional vent in a closed state.

FIGS. 13A and 13B illustrate an embodiment of a multi-chamber airbag 1310 with a vent 1343 and a gas guide 1350. A tether 1363 extends between the gas guide 1350 and a wall within the second inflatable chamber 1332 to prevent the gas guide 1350 from inverting through the aperture 1358 into the first inflatable chamber 1322. The tether 1363 may have a length, be positioned, or otherwise be configured such so that as the second cushion portion 1332 expands the tether 1363 restricts the gas guide 1350 from inverting through the aperture 1358. The tether 1363 may be drawn more taut as the second cushion portion 1332 expands, but not so taut as to prevent the gas guide 1350 from collapsing to block the aperture 1358. FIG. 13A is a perspective partial cut-away view of the airbag 1310 with the unidirectional vent 1343 in an open state. The tether 1363 becomes more completely taut once the gas guide 1350 collapses. FIG. 13B is a perspective partial cut-away view of the multi-chamber airbag 1310 with the gas guide 1350 collapsed and the unidirectional vent 1343 in a closed state. The tether 1363 is drawn taut when the gas guide collapses 1350 to prevent the gas guide 1350 from inverting through the aperture 1358.

Figure 14A:
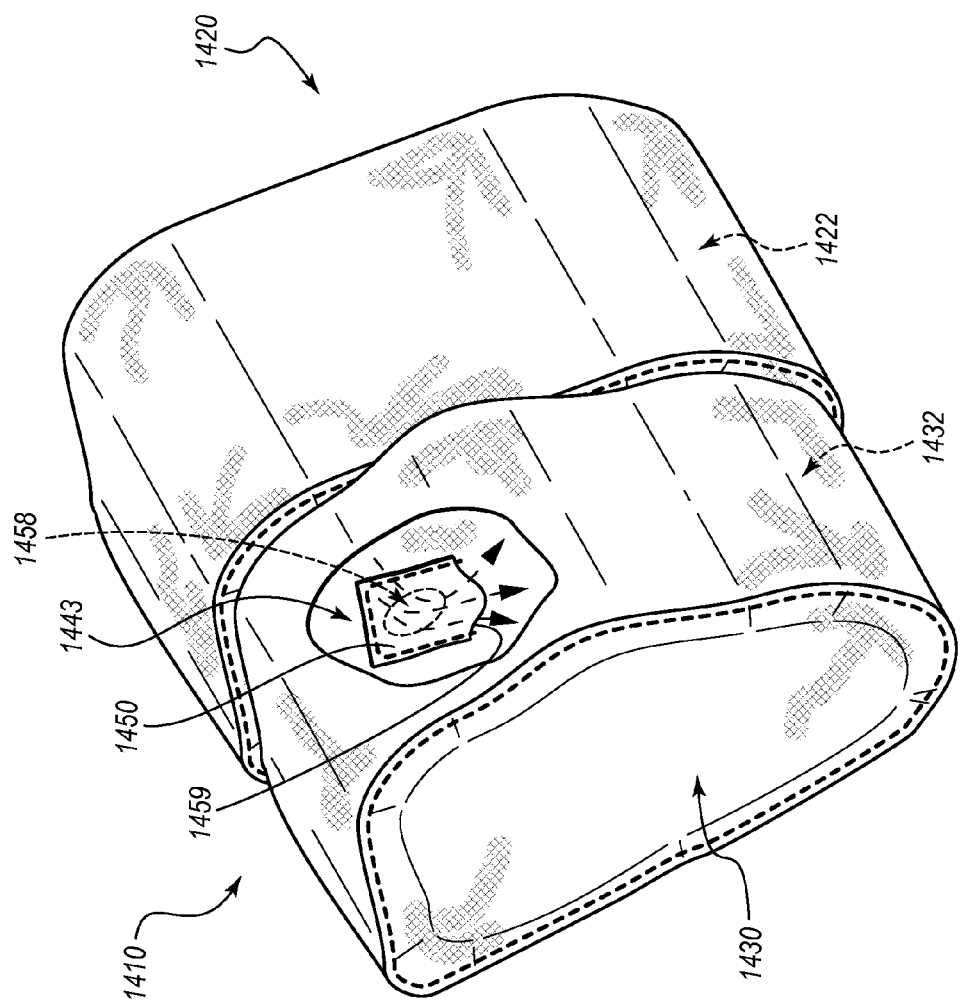
FIG. 14A is a perspective partial cut-away view of a multi-chamber airbag of an airbag assembly, according to another embodiment, with another embodiment of a unidirectional vent in an open state.
Figure 14B:
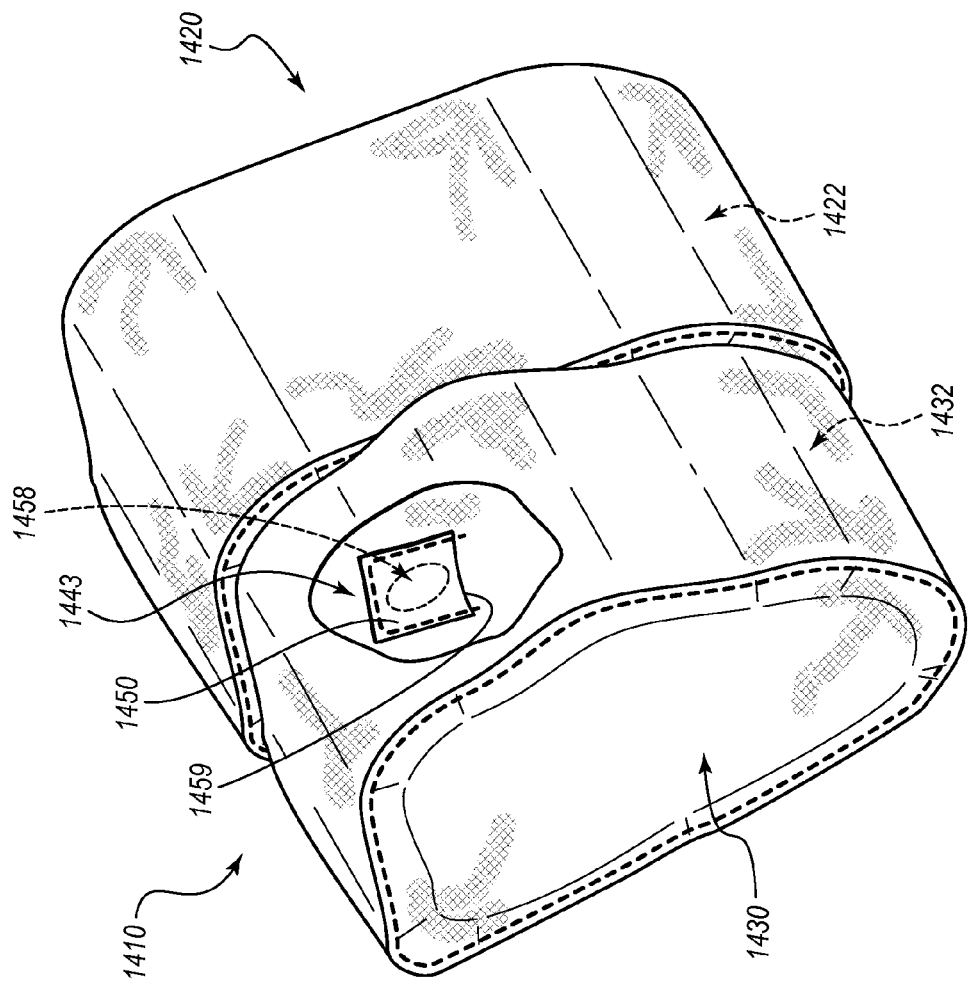
FIG. 14B is a perspective partial cut-away view of the multi-chamber airbag of FIG. 14A with the unidirectional vent in a closed state.

FIGS. 14A and 14B illustrate an embodiment of a multi-chamber airbag 1410 of an airbag assembly, according to another embodiment, with another embodiment of a unidirectional vent 1443 in an open state. The vent 1443 includes a patch 1450 that may be stitched or otherwise secured over an aperture 1458 of the vent 1443 in a manner to allow inflation gas to pass through the aperture 1458 from a first inflatable chamber 1422 to a second inflatable chamber 1432. FIG. 14A illustrates the vent 1443 in an open state. In the illustrated embodiment, the patch 1450 is square and is secured to an inner wall of a second cushion portion 1430, within the second inflatable chamber 1432, along three sides. A fourth side of the patch is not secured and allows inflation gas to pass from the aperture 1458 into the second inflatable chamber 1432.

As can be appreciated, other configurations are possible. For example, the patch 1450 may be circular and may be stitched or affixed substantially around the aperture 1458, with a portion of the patch 1450 left unsecured so as to allow inflation gas to pass from the aperture 1458 into the second inflatable chamber 1432. Other shapes are possible. Also, other securement configurations are possible. For example, a patch 1458 may be secured at two opposing sides, such that two opposing unsecured portions of the patch 1450 allow inflation gas to pass from the aperture 1458 into the second inflatable chamber 1432.

The vent 1443 is configured to isolate and maintain inflation pressure in the second inflatable chamber 1432, separate from the first inflatable chamber 1422, once equalization of pressure in the first and second inflatable chambers 1422, 1432 is achieved. As mentioned above, the vent 1443 may be configured to permit venting of inflation gases from the first inflatable chamber 1422 to the second inflatable chamber 1432. However, the patch 1450 of the vent 1442 restricts flow of inflation gas from the second inflatable chamber 1432 to the first inflatable chamber 1422.

FIG. 14B is a perspective partial cut-away view of the multi-chamber airbag 1410 with the unidirectional vent in a closed state. FIG. 14B illustrates the multi-chamber airbag 1410 with the first cushion portion 1420 and the second cushion portion 1430 both in an expanded state with inflation pressurization in the inflatable chambers 1422, 1432 equal or greater in the second inflatable chamber 1432 than in the first inflatable chamber 1422. Accordingly, the patch 1450 is pressed into abutment with the aperture 1458 to plug the aperture 1458 or otherwise obstruct airflow through the aperture 1458.

In the illustrated embodiment of FIGS. 14A and 14B, the second cushion portion 1430 is similar in size to the first cushion portion 1420. Also, the second cushion portion 1430 extends further toward an occupant than the first cushion portion 1420. In the illustrated embodiment, a portion of the occupant side of the second cushion portion 1430 extends outward (e.g., rearward toward an occupant) further than the occupant side of the first cushion portion 1420. In other embodiments, a larger portion or even the entire occupant side of the second cushion portion 1430 may even possibly extend toward the occupant to a similar or greater measure than the first cushion portion 1420. In other embodiments, the second cushion portion 1430 may extend higher, possibly even higher than the first cushion portion 1420. The second cushion portion 1430 may extend lower, possibly even lower than the first cushion portion 1420. The second cushion portion 1430 may extend further forward toward a front of the vehicle, possibly even more forward than the first cushion portion 1420, for example, to conform to the dashboard of the vehicle. In still other embodiments, the second cushion portion 1430 may be larger than the first cushion portion 1420.

Much of the foregoing disclosure has focused on passenger airbags. It should be understood that airbag features disclosed herein may be used with other types of airbags, as previously mentioned. For example, in some embodiments, driver airbags can include primary and secondary chambers such as disclosed herein.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
   a housing configured to be mounted in a dashboard of a vehicle at a first position;
   an inflator; and
   an airbag cushion that comprises:
      a first cushion portion coupled to the inflator and defining a first inflatable chamber to receive inflation gas from the inflator to expand the first cushion portion from a compact state to a deployed state, wherein the first cushion portion is configured to deploy from the housing and, in the deployed state when the housing is mounted in the dashboard of the vehicle at the first position, to cover a first portion of the dashboard to receive a torso of a vehicle occupant moving from a vehicle occupant position primarily in a forward direction relative to the vehicle;
      a second cushion portion connected to the first cushion portion and defining a second inflatable chamber to receive the inflation gas from the first inflatable chamber to expand the second cushion portion from a compact state to a deployed state, wherein the second cushion portion, in the deployed state and when the housing is mounted in the dashboard of the vehicle at the first position, covers a second portion of the dashboard that is laterally spaced from the first portion of the dashboard; and
      a unidirectional vent comprising:
         one or more apertures providing fluid communication between the first inflatable chamber to the second inflatable chamber; and
         a gas guide comprising a sleeve disposed around the one or more apertures and extending into the second inflatable chamber, the gas guide configured to expand to allow the inflation gas to vent through the one or more apertures into the second inflatable chamber and configured to collapse upon equalization of inflation gas pressure within the second inflatable chamber with inflation gas pressure within the first inflatable chamber, wherein the collapsed sleeve obstructs the one or more apertures and prevents backflow of the inflation gas into the first inflatable chamber from the second inflatable chamber; and a strap extending across an aperture of the one or more apertures between the gas guide and the first inflatable chamber to limit the sleeve of the gas guide from inverting through the aperture of the one or more apertures into the first inflatable cushion, the strap having a length greater than a diameter of the aperture and a width less than the diameter of the aperture, the strap comprising a first end and a second end, the first end of the strap attached to a wall within the second inflatable chamber and the second end attached to the wall within the second inflatable chamber and across the aperture from the first end.

2. The airbag assembly of claim 1, wherein the unidirectional vent comprises an adaptively closeable vent configured to close to restrict the flow of the inflation gas from the second inflatable chamber to the first inflatable chamber.

3. The airbag assembly of claim 1, wherein the unidirectional valve restricts flow of the inflation gas from the second inflatable chamber to the first inflatable chamber, to isolate the inflation gas in the second inflatable chamber from the inflation gas in the first inflatable chamber, upon the inflation gas pressure within the second inflatable chamber matching or exceeding the inflation gas pressure within the first inflatable chamber.

4. The airbag assembly of claim 1, wherein the first cushion portion is a primary cushion configured to deploy from the housing in a first direction toward the vehicle occupant position, and wherein the second cushion portion is a supplemental cushion configured to expand away from the first cushion portion in a second direction.

5. The airbag assembly of claim 4, wherein the second direction is lateral relative to the first direction.

6. The airbag assembly of claim 4, wherein the second cushion portion is configured to receive a head of the vehicle occupant when the vehicle occupant moves from the vehicle occupant position in a direction that is oblique relative to the forward direction and includes a component in the second direction.

7. An airbag assembly comprising:
a housing configured to be mounted in a vehicle at a first position;
an inflator; and
an airbag cushion that comprises:
a first cushion portion that defines a first inflatable chamber that is configured to receive inflation gas from the inflator to expand the first cushion portion from a compact state to a deployed state, wherein the first cushion portion is configured to deploy from the housing, and wherein the first cushion portion is configured to receive a torso of a vehicle occupant when the vehicle occupant moves from a vehicle occupant position primarily in a forward direction relative to the vehicle;
a second cushion portion connected to the first cushion portion, wherein the second cushion portion defines a second inflatable chamber that is configured to receive the inflation gas from the first inflatable chamber to expand the second cushion portion from a compact state to a deployed state to cover a region of the vehicle that is at a second position, wherein the second position is spaced laterally from the first position; and
an adaptively closeable vent that is internal to the airbag cushion and provides fluid communication between the first and the second inflatable chambers to permit flow of the inflation gas from the first inflatable chamber to the second inflatable chamber and configured to close to restrict flow of the inflation gas from the second inflatable chamber to the first inflatable chamber, the adaptively closable vent comprising:
one or more apertures providing the fluid communication between the first inflatable chamber to the second inflatable chamber; and
a gas guide comprising a sleeve disposed around the one or more apertures and extending into the second inflatable chamber, the gas guide configured to expand to allow the inflation gas to vent through the one or more apertures into the second inflatable chamber and configured to collapse upon equalization of inflation gas pressure within the second inflatable chamber with inflation gas pressure within the first inflatable chamber, wherein the collapsed sleeve obstructs the one or more apertures and prevents backflow of the inflation gas into the first inflatable chamber from the second inflatable chamber;
a strap extending across an aperture of the one or more apertures between the gas guide and the first inflatable chamber, the strap having a length greater than a diameter of the aperture and a width less than the diameter of the aperture; and
a tether extending between the gas guide and a wall within the second inflatable chamber to prevent the gas guide from inverting through the aperture of the one or more apertures into the first inflatable chamber.

8. The airbag assembly of claim 7, wherein the first cushion portion is configured to deploy from the housing in a first direction toward the vehicle occupant position, and wherein the second cushion portion is configured to expand away from the first cushion portion in a second direction.

9. The airbag assembly of claim 7, wherein the adaptively closeable vent restricts the flow of the inflation gas from the second inflatable chamber to the first inflatable chamber, to isolate the inflation gas in the second inflatable chamber from the inflation gas in the first inflatable chamber, upon the inflation gas pressure within the second inflatable chamber matching or exceeding the inflation gas pressure within the first inflatable chamber.

10. An airbag comprising:
a first cushion portion that defines a first inflatable chamber that is configured to receive inflation gas from an inflator to expand the first cushion portion from a compact state to a deployed state;
a second cushion portion connected to the first cushion portion, wherein the second cushion portion defines a second inflatable chamber that is configured to receive the inflation gas from the first inflatable chamber to expand the second cushion portion from a compact state to a deployed state; and
a unidirectional vent that permits flow of the inflation gas from the first inflatable chamber to the second inflatable chamber and restricts the flow of the inflation gas from the second inflatable chamber to the first inflatable chamber, the unidirectional vent comprising:
a plurality of apertures providing fluid communication between the first inflatable chamber to the second inflatable chamber, the plurality of apertures formed in a wall within the second inflatable chamber and forming one or more wall sections between the plurality of apertures, at least one wall section extending radially from a center of the plurality of apertures to prevent the gas guide from inverting through the plurality of apertures into the first inflatable chamber, the at least one wall section having a width less than a combined diameter of the plurality of apertures; and
a gas guide comprising a sleeve disposed around the plurality of apertures and extending into the second inflatable chamber, the gas guide configured to expand to allow the inflation gas to vent through the plurality of apertures into the second inflatable chamber and configured to collapse upon equalization of inflation gas pressure within the second inflatable chamber with inflation gas pressure within the first inflatable chamber, wherein the collapsed sleeve obstructs the plurality of apertures and prevents backflow of the inflation gas into the first inflatable chamber from the second inflatable chamber.

11. The airbag of claim 1, wherein the first cushion portion is configured to deploy primarily in a first direction toward a vehicle occupant position, and wherein the second cushion portion is configured to deploy primarily in a second direction that is lateral to the first direction.

12. An airbag assembly comprising:
a housing configured to be mounted in a dashboard of a vehicle;
an inflator; and
an airbag cushion that comprises:
a primary cushion portion coupled to the inflator and defining a first inflatable chamber to receive inflation gas from the inflator to expand the primary cushion portion from a compact state to a deployed state, wherein the primary cushion portion is configured to deploy from the housing and, in the deployed state, when the housing is mounted in the dashboard of the vehicle, to cover a first portion of the dashboard to receive a torso of a vehicle occupant when the vehicle occupant moves from a vehicle occupant position primarily in a forward direction relative to the vehicle;
a supplemental cushion portion connected to the primary cushion portion and defining a second inflatable chamber to receive the inflation gas from the first inflatable chamber to expand the supplemental cushion portion from a compact state to a deployed state, wherein the supplemental cushion in the deployed state covers a second portion of the dashboard that is closer to a center of the vehicle than the first portion of the dashboard; and
a unidirectional vent that is internal to the airbag cushion to permit flow of the inflation gas from the first inflatable chamber to the second inflatable chamber and, upon an inflation gas pressure within the second inflatable chamber equalizing with an inflation gas pressure within the first inflatable chamber, to restrict the flow of the inflation gas from the second inflatable chamber to the first inflatable chamber and to isolate the inflation gas in the second inflatable chamber from the inflation gas in the first inflatable chamber, the unidirectional vent forming an adaptively closeable vent comprising:
one or more apertures providing fluid communication between the first inflatable chamber to the second inflatable chamber; and
a gas guide comprising a sleeve disposed around the one or more apertures and extending into the second inflatable chamber, the gas guide configured to expand to allow the inflation gas to vent through the one or more apertures into the second inflatable chamber and configured to collapse upon equalization of the inflation gas pressure within the second inflatable chamber with the inflation gas pressure within the first inflatable chamber, wherein the collapsed sleeve obstructs the one or more apertures and prevents backflow of the inflation gas into the first inflatable chamber from the second inflatable chamber; and
a strap extending across an aperture of the one or more apertures between the gas guide and the first inflatable chamber, the strap having a length greater than a diameter of the aperture and a width less than the diameter of the aperture.

* * * * *